US009210721B2

(12) United States Patent
Ueda et al.

(10) Patent No.: US 9,210,721 B2
(45) Date of Patent: Dec. 8, 2015

(54) COMMUNICATION DELAY TIME DERIVATION METHOD, COMMUNICATION TERMINAL AND COMMUNICATION DELAY TIME DERIVATION PROGRAM

(75) Inventors: Hirofumi Ueda, Tokyo (JP); Norihito Fujita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 176 days.

(21) Appl. No.: 13/976,316

(22) PCT Filed: Mar. 14, 2012

(86) PCT No.: PCT/JP2012/001776
§ 371 (c)(1),
(2), (4) Date: Jun. 26, 2013

(87) PCT Pub. No.: WO2012/127820
PCT Pub. Date: Sep. 27, 2012

(65) Prior Publication Data
US 2013/0272205 A1    Oct. 17, 2013

(30) Foreign Application Priority Data

Mar. 22, 2011 (JP) .................................. 2011-063018

(51) Int. Cl.
| | |
|---|---|
| *H04W 4/00* | (2009.01) |
| *H04W 74/08* | (2009.01) |
| *H04W 56/00* | (2009.01) |
| H04W 40/12 | (2009.01) |
| H04W 84/18 | (2009.01) |
| H04W 40/16 | (2009.01) |

(52) U.S. Cl.
CPC .......... *H04W 74/08* (2013.01); *H04W 56/0055* (2013.01); *H04W 56/0085* (2013.01); *H04W 40/12* (2013.01); *H04W 40/16* (2013.01); *H04W 84/18* (2013.01)

(58) Field of Classification Search
CPC .......................................... H04W 40/12–40/18
USPC ......................................................... 370/328
See application file for complete search history.

(56) References Cited

U.S. PATENT DOCUMENTS

| | | | |
|---|---|---|---|
| 2009/0109901 A1* | 4/2009 | Kondo et al. .................. | 370/328 |
| 2010/0054192 A1* | 3/2010 | Kim et al. ..................... | 370/329 |

(Continued)

FOREIGN PATENT DOCUMENTS

| | | |
|---|---|---|
| JP | 2007-189619 A | 7/2007 |
| JP | 2007-329870 A | 12/2007 |
| WO | 2007/007380 A1 | 1/2007 |

(Continued)

OTHER PUBLICATIONS

International Search Report for PCT Application No. PCT/JP2012/001776 mailed on May 22, 2012.

*Primary Examiner* — Chi H Pham
*Assistant Examiner* — Fahmida Chowdhury

(57) ABSTRACT

There is provided a communication delay time derivation method for calculating a communication delay time depending on a combination of channels set between communication terminals on a communication path in the MCH/IF environment. When selecting a channel to be used for communication in each section on the communication path per section between communication terminals on the communication path, a calculation target section specification means 82 detects an inter-terminal selected channel repetitive pattern as a pattern of the selected channels cyclically appearing on the communication path, and defines a section corresponding to the inter-terminal selected channel repetitive pattern as a communication delay time calculation target section. A communication delay time derivation means 83 derives a communication delay time in the calculation target section based on the inter-terminal selected channel repetitive pattern.

10 Claims, 14 Drawing Sheets

(56) References Cited

U.S. PATENT DOCUMENTS

2011/0261738 A1* 10/2011 Mukherjee .................. 370/311
2013/0077477 A1* 3/2013 Daraiseh et al. ............. 370/225

FOREIGN PATENT DOCUMENTS

| WO | 2008/070871 A2 | 6/2008 |
| WO | 2008/105091 A1 | 9/2008 |

* cited by examiner

COMMUNICATION DELAY TIME DERIVATION METHOD, COMMUNICATION TERMINAL AND COMMUNICATION DELAY TIME DERIVATION PROGRAM

This application is a National Stage Entry of PCT/JP2012/001776 filed Mar. 14, 2012, which claims priority from Japanese Patent Application 2011-063018 filed Mar. 22, 2011, the contents of all of which are incorporated herein by reference, in their entirety.

TECHNICAL FIELD

The present invention relates to a communication delay time derivation method for calculating a communication delay time of a communication path, a communication terminal, and a communication delay time derivation program, and particularly to a communication delay time derivation method for defining a channel per section between communication terminals and calculating a communication delay time when a plurality of channels is used on a communication path, a communication terminal, and a communication delay time derivation program.

BACKGROUND ART

In recent years, along with a development in wireless techniques, a wireless ad-hoc network is desired to realize in cognitive radio or multi-channel/multi-interface (referred to as MCH/IF below) environments.

The wireless ad-hoc network in the MCH/IF environment contains, as a node, a communication terminal including a plurality of wireless interfaces to which bands (channels) with different communication properties are assigned.

How to assign the channels to the wireless interfaces may employ some aspects. For example, there may be employed an aspect in which a plurality of channels is assigned to one wireless interface and the wireless interface instantaneously switches to a proper channel on communication. There may be employed an aspect in which one channel is assigned to one wireless interface and the same channel keeps being used during a certain period.

There will be described, in the following description, an example in which one channel is assigned to one wireless interface. In this case, to select a wireless interface used for communication means to select a channel.

A property of a communication link forming the MCH/IF topology is largely different depending on whether the band used for the wireless interface is high or low. For example, for the VHF or UHF band with a low frequency, long-distance communication is possible but a communication capacity is limited to several hundred kbps (bit per second). On the other hand, for the SHF band with a high frequency of 3 GHz or more, the capacity ranges from several Mbps to several hundred Mbps but the communication range is narrowed to several hundred meters to several tens meters.

The communication terminal uses a plurality of wireless interfaces assigned with different channels. Thus, the number of recognizable neighboring communication terminals is different and the capacity is also different for each wireless interface. A plurality of communication links having different communication properties (capacity or communication range) may be present for the same communication terminal.

Thus, each communication terminal needs to select an optimum channel for a communication path from among the available channels and to construct a communication path according to a communication purpose. FIG. 12 is an explanatory diagram illustrating exemplary channels selected between communication terminals on a communication path. In the example illustrated in FIG. 12, a plurality of consecutive arrows indicate a communication path. The example illustrated in FIG. 12 indicates a case in which any channel of CH1, CH2 and CH3 is selected between the individual communication terminals.

Various policies may be assumed for a channel select policy for the communication terminals on the communication path. For example, there may be assumed a select policy of preferentially selecting a channel with a long propagation distance such that the number of transfers is minimum or a select policy of preferentially selecting a channel with a wide communication capacity. FIG. 13 illustrates an example in which channels are selected according to the former select policy and FIG. 14 illustrates an example in which channels are selected according to the latter select policy. FIG. 13 and FIG. 14 illustrate the examples in which the channels between the communication terminals are selected from the three channels of CH1 to CH3. The communication capacities are assumed to have a relationship of (communication capacity of CH1)<(communication capacity of CH2)<(communication capacity of CH3). The propagation distances are assumed to have a relationship of (propagation distance of CH1)>(propagation distance of CH2)>(propagation distance of CH3). As illustrated in FIG. 13 or FIG. 14, various combinations of channels to be assigned to each link on the communication path are present depending on a channel select policy.

Patent Literature 1 describes therein that a frequency band division pattern in a base station is used in a plurality of bases.

Patent Literature 2 describes therein a method for assigning wireless resources for calculating a delay time, and the like. With the method described in Patent Literature 2, a delay time in one hop section such as between a base station and a terminal is calculated.

Patent Literature 3 describes therein how to calculate a delay time per unit distance.

CITATION LIST

Patent Literature

PLT1: JP 2007-189619 A (see paragraph 0001 and FIG. 6)
PLT2: Republished Patent WO 2007/007380 A (paragraph 0046)
PLT3: JP 2007-329870 A (paragraph 0036)

SUMMARY OF INVENTION

Technical Problem

It is preferable that a communication delay time is short when a channel of each section is selected per section between communication terminals. In order to do that, it is necessary to grasp a combination of channels present depending on a capacity value requested for communication and to calculate a communication delay time in the combination of channels.

The combination of channels depending on the request capacity value can be grasped by the following method, for example. That is, the combination of channels on the communication path can be grasped by actually transmitting a message to other communication terminal for inquiry or making a guess based on a channel use situation of other communication terminal and a channel select policy.

When a destination communication terminal is clear, the communication delay times according to a combination of channels can be compared by measuring a communication delay time to the destination for all the combinations of channels. However, when a distance to the destination is long and many combinations of channels are present, an overhead required for measuring a communication delay time is remarkably large.

Further, when a destination is not uniquely defined unlike broadcast distribution and is unclear, a measurement section (start point and end point) of the communication delay time cannot be defined. The communication terminals or the end communication terminal on the communication path changes depending on a combination of channels, and thus a measurement section is more difficult to set.

It is therefore an object of the present invention to provide a communication delay time derivation method for calculating a communication delay time depending on a combination of channels set between communication terminals on a communication path in the MCH/IF environment, a communication terminal, and a communication delay time derivation program.

Solution to Problem

A communication delay time derivation method according to the present invention is characterized in that a communication terminal including at least one wireless interface assigned with a communication channel detects an inter-terminal selected channel repetitive pattern as a pattern of selected channels cyclically appearing on a communication path when selecting a channel to be used for communication in each section on the communication path per section between communication terminals on the communication path, and defines a section corresponding to the inter-terminal selected channel repetitive pattern as a communication delay time calculation target section, and derives a communication delay time in the calculation target section based on the inter-terminal selected channel repetitive pattern.

A communication terminal according to the present invention is characterized by including at least one wireless interface assigned with a communication channel, a calculation target section specification means for, when selecting a channel to be used for communication in each section on a communication path per section between communication terminals on the communication path, detecting an inter-terminal selected channel repetitive pattern as a pattern of the selected channels cyclically appearing on the communication path, and defining a section corresponding to the inter-terminal selected channel repetitive pattern as a communication delay time calculation target section, and a communication delay time derivation means for deriving a communication delay time in the calculation target section based on the inter-terminal selected channel repetitive pattern.

A communication delay time derivation program according to the present invention, which is mounted on a computer including at least one wireless interface assigned with a communication channel, is characterized by causing the computer to perform a calculation target section specification processing of, when selecting a channel to be used for communication in each section on a communication path per section between communication terminals on the communication path, detecting an inter-terminal selected channel repetitive pattern as a pattern of the selected channels cyclically appearing on the communication path, and defining a section corresponding to the inter-terminal selected channel repetitive pattern as a communication delay time calculation target section, and a communication delay time derivation processing of deriving a communication delay time in the calculation target section based on the inter-terminal selected channel repetitive pattern.

Advantageous Effects of Invention

According to the present invention, it is possible to calculate a communication delay time depending on a combination of channels set between communication terminals on a communication path in the MCH/IF environment.

DESCRIPTION OF EMBODIMENTS

Exemplary embodiments according to the present invention will be described below with reference to the drawings.

First Exemplary Embodiment

Figure 1:
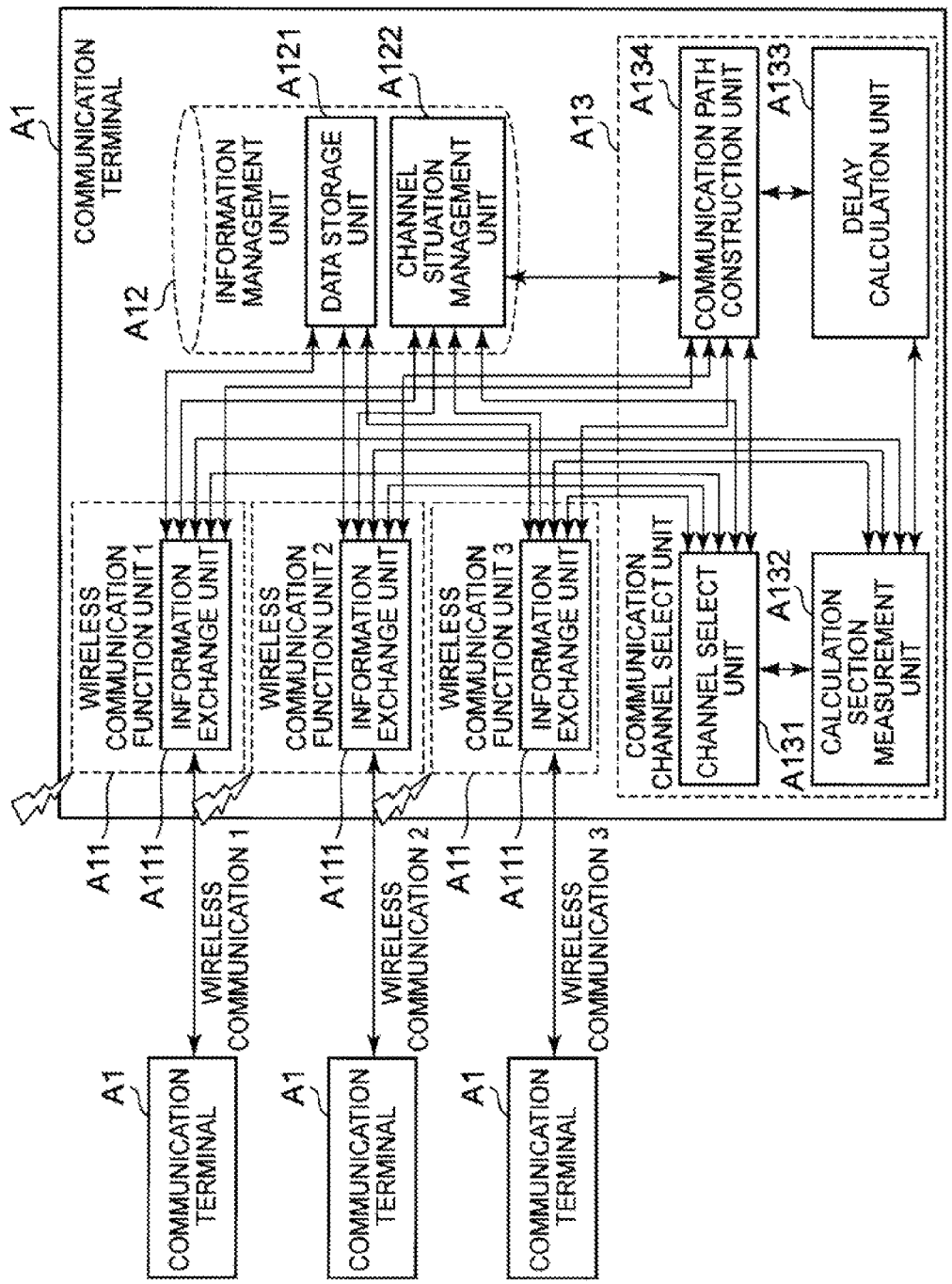
FIG. 1 It depicts a block diagram illustrating an exemplary communication terminal according to a first exemplary embodiment of the present invention.
Figure 2:
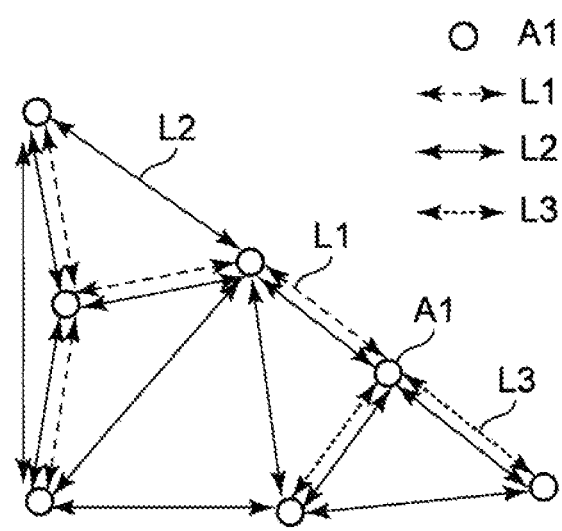
FIG. 2 It depicts an explanatory diagram illustrating an exemplary ad-hoc network formed by a plurality of communication terminals.

FIG. 1 is a block diagram illustrating an exemplary communication terminal according to a first exemplary embodiment of the present invention. A communication terminal A1 according to the present invention includes a plurality of wireless communication function units A11 for making wireless communication with other communication terminals, an information management unit A12 for managing information held by the communication terminal A1, and a communication channel select unit A13 for selecting a channel to be used for communication. Many communication terminals A1 collectively form an ad-hoc network. FIG. 2 illustrates an exemplary ad-hoc network formed by the communication terminals A1. The communication terminals A1 make wireless communication L1, L2 or L3, for example. A topology illustrated in FIG. 2 is exemplary. The structures and operations of the respective communication terminals A1 are the same. The following explanation will be made assuming that a plurality of channels available to the communication terminals A1 is common.

The wireless communication function unit A11 corresponds to a wireless interface. FIG. 1 illustrates a case in which three wireless communication function units A11 are provided, but at least two wireless communication function units A11 need to be provided in one communication terminal A1.

There may be configured such that one communication terminal A1 includes one wireless communication function unit A11 and the wireless communication function unit A11 instantaneously switches a channel. In this case, it can be considered that one wireless communication function unit A11 virtually functions as a plurality of wireless communication function units.

The wireless communication function unit A11 includes an information exchange unit A111. The information exchange unit A111 has a function of determining a channel and a communication system to be used for wireless communication and starting wireless communication with other communication terminals. The information exchange unit A111 exchanges a channel use situation of its communication terminal (denoted as self terminal below) and neighboring communication terminals stored in a channel situation management unit A122 in the information management unit A12 with other communication terminals, and stores the channel use situation received from other communication terminals in the channel situation management unit A122. The channel use situation is information indicative of a channel assignment situation and a free capacity. Further, the information exchange unit A111 periodically exchanges, with other communication terminals other than the self terminal, a channel use situation of the self terminal, neighboring terminal information, content information (such as data including animations, voices and images held by the self terminal), position information, and information on other communication terminals received from the communication terminals. The information exchange unit A111 stores the neighboring terminal information, the content information and the position information received from other communication terminals in a data storage unit A121 in the information management unit A12. The number of communication terminals making communication with one communication terminal is not limited to one. The neighboring terminal information is information indicative of neighboring communication terminals.

The information exchange unit A111 transmits a channel select request to other communication terminal and receives a channel select request from other communication terminal. The information exchange unit A111 notifies a channel select request to a channel select unit A131 when receiving the channel select request from other communication terminal, and transmits selected channel information to a communication terminal as a channel select request transmission source when receiving the selected channel information from the channel select unit A131. The selected channel information is information indicative of the channels selected (determined) in the channel select unit A131. When transmitting a channel select request from the self terminal to other communication terminal and receiving selected channel information as a response, the information exchange unit A111 transmits the received selected channel information to a calculation section measurement unit A132. The channel select unit A131 and the calculation section measurement unit A132 will be described later.

The information management unit A12 includes the data storage unit A121 and the channel situation management unit A122.

The data storage unit A121 has a function of storing, updating and deleting the neighboring terminal information or position information of the self terminal, the content information created by the self terminal, and the information on other communication terminals received from the communication terminals. The data storage unit A121 has a function of transmitting the information requested from the information exchange unit A111 to the information exchange unit A111.

The channel situation management unit A122 has a function of storing, updating and deleting the channel use situation of the self terminal and other communication terminals, and the information on channels used in the communication path transmitted from a communication path construction unit A134. The communication path construction unit A134 will be described later. The channel situation management unit A122 has a function of, when the information is updated or when receiving an information acquisition request from other terminal, transmitting the information to other terminal via the information exchange unit A111 or receiving the latest information on other communication terminal via the information exchange unit A111.

The communication channel select unit A13 includes the channel select unit A131, the calculation section measurement unit A132, a delay calculation unit A133 and the communication path construction unit A134.

When receiving a communication path request capacity from the calculation section measurement unit A132 or receiving a channel select request describing the communication path request capacity from other information terminal via the information exchange unit A111, the channel select unit A131 selects available channels in consideration of the communication capacity acquirable by the self terminal. Then, the channel select unit A131 selects one channel to be used from among the available channels according to a channel select policy. The communication path request capacity is used by the channel select unit A131 for selecting a channel such that a communication delay time of the communication path is short.

The following method may be used as a method for selecting a channel in consideration of the communication capacity acquirable by the self terminal, for example. For example, the channel select unit A131 may read a channel use situation of a neighboring terminal from the channel situation management unit A122, calculate an interference when the self terminal uses the channel, and select a channel meeting the communication path request capacity. A channel meeting the communication path request capacity may be selected simply based on the communication capacity of the current channel. If a channel meeting the communication path request capacity is not present in selecting a channel, at least one channel may be selected by selecting a channel with the largest acquirable capacity or selecting a channel with the longest propagation distance.

Various selection policies may be employed for a channel select policy for determining a channel to be used from among the selected channels. For example, there may be employed a select policy for selecting a channel with a long propagation distance in order to minimize the number of transfers. Alternatively, there may be employed a select policy for selecting a channel with the maximum acquirable communication capacity. The channel select unit A131 may determine one channel to be used from among the selected channels according to a select policy. Only one select policy may be continuously used, and a plurality of select policies may be switched for use depending on a communication type or the like.

Figure 3:
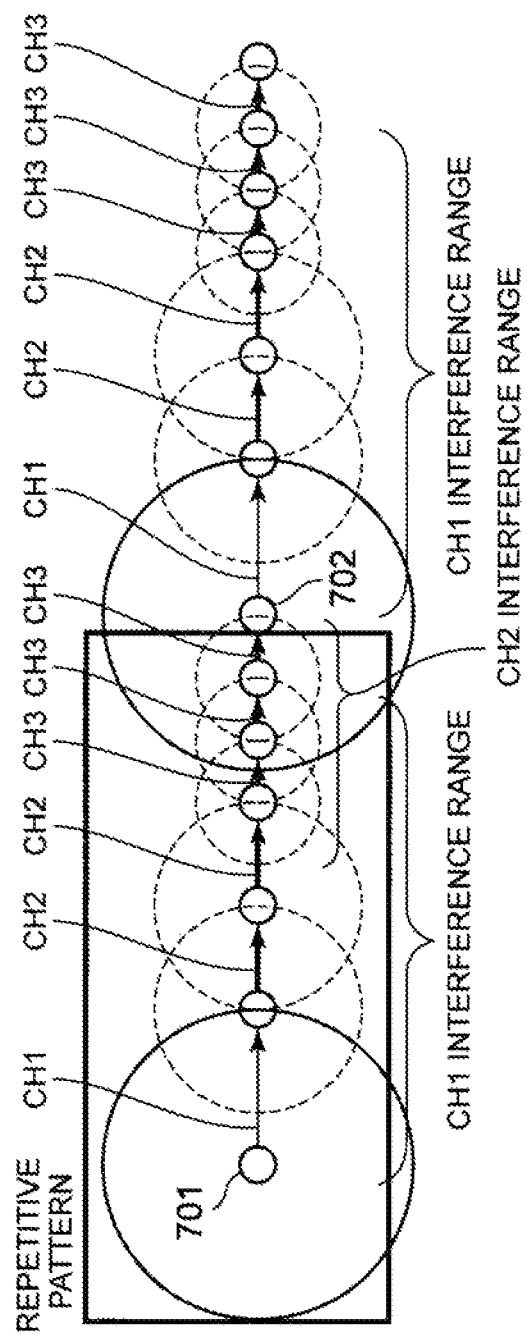
FIG. 3 It depicts an explanatory diagram illustrating an exemplary inter-terminal selected channel repetitive pattern in a communication path.
Figure 4:
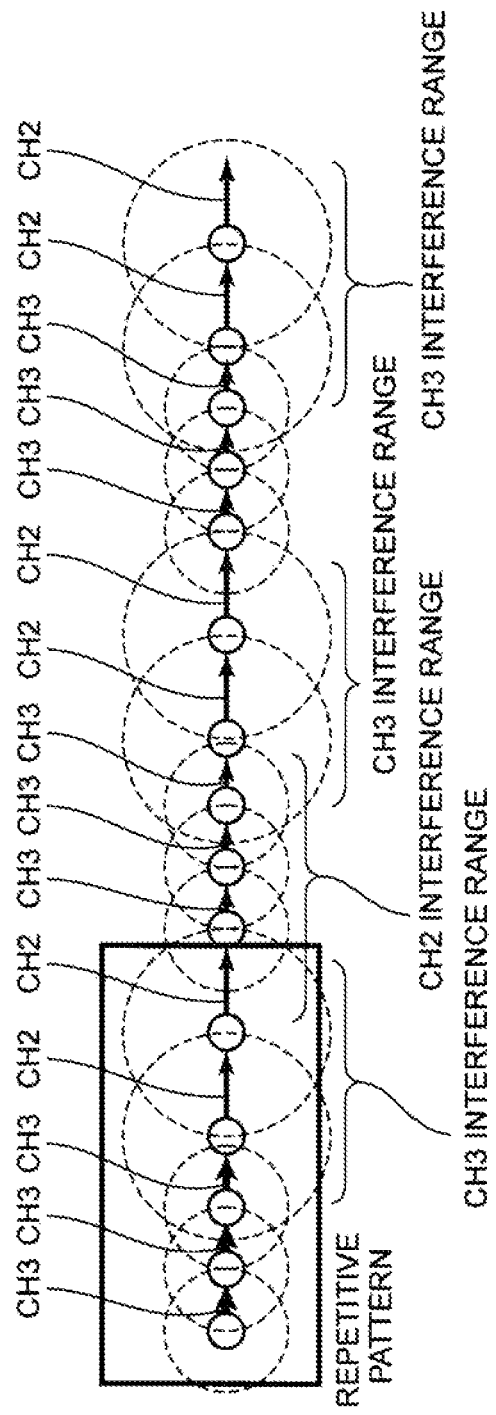
FIG. 4 It depicts an explanatory diagram illustrating an exemplary inter-terminal selected channel repetitive pattern in a communication path.

FIG. 3 and FIG. 4 are the explanatory diagrams illustrating an exemplary inter-terminal selected channel repetitive pattern in a communication path. According to the present invention, when a channel in each section is selected per section between communication terminals, a pattern of the selected channels between the communication terminals is cyclically repeated. The pattern of the selected channels for one cycle will be denoted as an inter-terminal selected channel repetitive pattern. In FIG. 3 and FIG. 4, an arrangement of the channels indicated within a rectangle corresponds to an inter-terminal selected channel repetitive pattern. FIG. 3 illustrates, by way of example, an inter-terminal selected channel repetitive pattern when a select policy for selecting a channel with a long propagation distance is employed. FIG. 4 illustrates, by way of example, an inter-terminal selected channel repetitive pattern when a select policy for selecting a channel with the maximum communication capacity is employed.

When the channel select unit A131 in each communication terminal selects channels based on the communication path request capacity and determines one channel to be used from among the channels according to a select policy, the inter-terminal selected channel repetitive pattern illustrated in FIG. 3 or FIG. 4 is generated. A communication terminal outside a channel interference range (a range in which the communication capacity acquirable by the communication terminal is equal to or less than the communication path request capacity) and on the downstream side of the communication path selects the same channel as a communication terminal on the upstream side. Herein, the channel interference range is a range in which communication terminals using the same band radio wave (channel) are present and the radio waves of the communication terminals influence mutual communication.

The structures of the individual communication terminals are the same, and an individual communication terminal operates according to the same channel select algorithm or select policy. Consequently, a communication terminal present outside the channel interference range and on the downstream side of the communication path selects the same channel as a communication terminal on the upstream side so that the inter-terminal selected channel repetitive pattern repeatedly appears. For example, in the example illustrated in FIG. 3, a communication terminal 702 selects CH1 similarly to a communication terminal 701 so that the same pattern as the inter-terminal selected channel repetitive pattern starting with the communication terminal 701 appears also after the communication terminal 702. In this way, each time the channel interference range is exceeded, the same inter-terminal selected channel repetitive pattern appears in the communication path.

According to the present exemplary embodiment, when the channel select unit A131 receives a communication path request capacity and a channel select request from the calculation section measurement unit A132 or the information exchange unit A111, the channel select unit A131 sets the received communication path request capacity as a threshold. Then, the channel select unit A131 reads a channel use situation of a neighboring communication terminal from the channel situation management unit A122, and calculates an available communication capacity when the self terminal uses the channel. The calculation may be made as follows. When calculating an available communication capacity when the self terminal uses a channel, the channel select unit A131 grasps the number of communication terminals already using the channel within the interference range. At this time, the number of communication terminals may be grasped with reference to the channel use situation.

Then, the channel select unit A131 adds 1 as the number of self terminals to the number of communication terminals. The channel select unit A131 finds a value obtained by dividing the channel capacity by the addition result as an available communication capacity when the self terminal uses the channel. That is, the available communication capacity when the self terminal uses the channel is calculated in the following Equation (1).

(Available communication capacity when self terminal uses channel)=channel capacity/(number of communication terminals already using channel within interference range+1)    Equation (1)

The channel select unit A131 makes the above calculation per channel thereby to calculate an available communication capacity. The available communication terminal based on the above calculation selects channels meeting the communication path request capacity. Further, the channel select unit A131 determines one channel to be used for communication from among the selected channels according to a predetermined channel select policy (such as select policy for selecting a channel with a long propagation distance).

When receiving a channel select request from the calculation section measurement unit A132, the channel select unit A131 notifies selected channel information indicative of the determined channel to the calculation section measurement unit A132. When receiving a channel select request from other communication terminal via the information exchange unit A111, the channel select unit A131 transmits the selected channel information indicative of the determined channel to the communication terminal as a channel select request transmission source via the information exchange unit A111.

The calculation section measurement unit A132 measures an inter-terminal selected channel repetitive pattern occurring on the communication path as a section to measure a communication delay time based on the communication path request capacity received from the delay calculation unit A133, and specifies a combination of channels in the section (an assignment of channels in the section). The calculation section measurement unit A132 creates information indicative of communication terminals in the section corresponding to the inter-terminal selected channel repetitive pattern and the assignment of the channels in the section (which will be denoted as delay measurement section information below).

When receiving the communication path request capacity and a measurement request for the delay measurement section from the delay calculation unit A133, the calculation section measurement unit A132 causes the channel select unit A131 to determine a channel to be used for communication by the self terminal. Thereafter, the calculation section measurement unit A132 transmits a channel select request to a neighboring communication terminal via the information exchange unit A111 in the wireless communication function unit A11 corresponding to the channel, and examines an occurrence of the inter-terminal selected channel repetitive pattern.

The method for examining an inter-terminal selected channel repetitive pattern may employ the following method, for example. For example, a collective management type broadcast tree creation method may be used. A channel select request is transmitted to a neighboring communication terminal to select channels and the self terminal repeats the operation of selecting a channel as a tree path from the channels so that the inter-terminal selected channel repetitive pattern in the communication path around the self terminal can be examined.

When simply flooding path search messages and transferring the path search messages not with the collective management type, the inter-terminal selected channel repetitive pattern may be examined by performing the above channel determination operation thereby to check a combination of channels on the communication path per flooding path. When a path to the destination per channel usable by the self terminal can be known or estimated depending on the path table or channel use situation, the channels used for the path can be estimated thereby to grasp the channel assignment pattern.

The present exemplary embodiment describes the case in which a plurality of channels usable in the communication terminals A1 is common by way of example, but the usable channel types may be different per communication terminal A1. When a usable channel is different per communication terminal A1, an inter-terminal selected channel repetitive pattern may not occur. In this case, the inter-terminal selected channel repetitive pattern may be examined assuming that the channels with similar channel properties (communication bandwidth and propagation distance) are the same channel. When a similarity between the assignment patterns of the appearing channels is calculated and the similarity is equal to or more than the threshold, the two patterns may be assumed as the same pattern and the pattern may be determined as an inter-terminal selected channel repetitive pattern.

In order to determine the threshold, for example, a surrounding channel situation is previously scanned and all the channels usable in the network constructed by the communication terminals A1 are grasped so that the threshold of the similarity may be determined based on how much the channels assigned to the wireless communication function units A11 by the communication terminals A1 are overlapped between the communication terminals A1.

It is assumed that a few of channels are usable in the network constructed by the communication terminals A1. In this case, the respective communication terminals A1 are likely to assign the same channel to the wireless communication function units A11. Thus, it is determined that a pattern which can be considered as an inter-terminal selected channel repetitive pattern is likely to occur, and the threshold of the similarity may be set to be as high as 90%, for example. To the contrary, it is assumed that many channels are usable in the network constructed by the communication terminals A1. In this case, the respective communication terminals A1 are less likely to assign the same channel to the wireless communication function units A11. Thus, it is determined that a pattern which can be considered as an inter-terminal selected channel repetitive pattern is less likely to occur, and the threshold of the similarity may be set to be as low as 30%, for example.

With the above method, the calculation section measurement unit A132 examines the channel assignment on the communication path, and when the same channel assignment pattern occurs, determines the pattern as an inter-terminal selected channel repetitive pattern, and terminates the examination. Thereby, a range corresponding to the inter-terminal selected channel repetitive pattern can be assumed as a communication delay time measurement section, and a range to be measured can be reduced than the distance to the communication destination is assumed as a communication delay measurement section. Consequently, an overhead of the communication delay time measurement can be reduced.

The method for examining an inter-terminal selected channel repetitive pattern is exemplary, and an inter-terminal selected channel repetitive pattern may be examined by other method.

When the repeated part in the channel assignment pattern (or the inter-terminal selected channel repetitive pattern) is completely grasped, the calculation section measurement unit A132 transmits the delay measurement section information indicative of the communication terminals in the section corresponding to the inter-terminal selected channel repetitive pattern and the channel assignment in the section to the delay calculation unit A133.

The delay calculation unit A133 sets a request capacity (communication path request capacity) used for selecting a channel based on the request capacity for the communication path from a user or application software (which will be denoted as user/application request capacity below) such that the user/application request capacity is met and the communication delay time in the communication path is reduced.

The delay calculation unit A133 calculates a communication delay time per unit distance in the section corresponding to the inter-terminal selected channel repetitive pattern based on the delay measurement section information received from the calculation section measurement unit A132.

When receiving the user/application request capacity, the delay calculation unit A133 first sets a communication path request capacity at a value equal to or more than the user/application request capacity. Then, the communication path request capacity is notified to the calculation section measurement unit A132 in order to calculate a communication delay time occurring due to a combination of channels in the communication path assigned by the set communication path request capacity.

The communication terminal information in the delay measurement section (or the section corresponding to the inter-terminal selected channel repetitive pattern) and the channel assignment information are acquired as the delay measurement section information from the calculation section measurement unit A132 and a communication delay time per unit distance is calculated when a communication path is constructed in the set communication path request capacity. The method for calculating a communication delay time per unit distance may use the following method, for example.

For example, the channels used in the transfer path and the communication to be used are designated for the communication terminals in the delay measurement section based on the channel assignment information contained in the delay measurement section information like source routing, thereby measuring a communication delay time. When a measurement section is measured in the calculation section measurement unit A132, a communication delay time may be measured together to be notified to the delay calculation unit A133. In order to reduce capacity loads due to communication, a communication delay time in the measurement section may be predicted based on the previously-grasped channel communication capacity.

When the position information on the communication terminals is available, the delay calculation unit A133 may calculate a communication delay time per unit distance by finding a distance of the delay measurement section based on the position information on each communication terminal and dividing the communication delay time by the distance of the communication delay section. When the position information on the communication terminals is unknown and the channel propagation distance is known, a distance of the delay measurement section may be found by use of the channel assignment information on the delay measurement section. A communication delay time per unit distance may be calculated by use of the distance. A communication delay time per unit distance may be calculated by measuring a distance between communication terminals based on a propagation delay thereby to find a distance of the delay measurement section.

As described above, the delay calculation unit A133 calculates a communication delay time per unit distance for one communication path request capacity. The method for calculating a communication delay time per unit distance is exemplary, and a communication delay time per unit distance may be calculated by other method.

When a communication delay time per unit distance is completed to calculate for one communication path request capacity, the delay calculation unit A133 sets the communication path request capacity at a different value again, and calculates a communication delay time per unit distance. The processings are repeated several times until the predetermined condition is met.

The communication delay per unit distance is compared per different communication path request capacity so that a communication path request capacity capable of reducing a communication delay is specified from among the communication path request capacities meeting the user/application request capacity. That is, a communication path request capacity in which a communication delay time per unit distance is minimum is specified from among the communication path request capacities set at the values equal to or more than the user/application request capacity. The communication path request capacity is determined as a communication path request capacity used for constructing an actual communication path. With the processing, also when the lengths of the delay measurement sections are different, the communication delay times can be calculated and compared according to a combination of channels on the communication path.

Alternatively, the delay calculation unit A133 may estimate a communication delay time required to the destination by use of the delay measurement section information.

The delay calculation unit A133 may estimate a communication delay time based on the channel assignment information contained in the delay measurement section information, and a size of data to be transmitted (a size of data to be transferred along the communication path). A channel transfer delay in one hop can be obtained by dividing the data size of data to be transferred in a channel by the capacity of the channel. Therefore, an inter-terminal selected channel repetitive pattern is extracted from the delay measurement section information, and the data size is divided by the capacity of the channel per channel configuring the inter-terminal selected channel repetitive pattern. A communication delay time may be calculated by the calculated sum. For example, it is assumed that the inter-terminal selected channel repetitive pattern is CH1, CH2, CH2 and CH3 in this order. In this case, a communication delay time may be calculated by the following Equation (2).

$$\begin{aligned}\text{Communication delay time} =& \text{(size of data to be transferred in } CH1)/ \\ & \text{(capacity of } CH1) + \\ & \text{(size of data to be transferred in } CH2)/ \\ & \text{(capacity of } CH2) + \\ & \text{(size of data to be transferred in } CH2)/ \\ & \text{(capacity of } CH2) + \\ & \text{(size of data to be transferred in } CH3)/ \\ & \text{(capacity of } CH3)\end{aligned}$$ Equation (2)

Then, the delay calculation unit A133 may calculate a communication delay time per unit distance by dividing the communication delay time estimated in Equation (2) by the distance of the delay measurement section.

The following condition may be used as a condition of the repeated calculations for a communication delay time per unit distance, for example.

For example, there may be repeated certain times a processing of randomly defining a communication path request capacity which is equal to or more the user/application request capacity and is equal to or less than the maximum capacity of the available channel and calculating a communication delay time per unit distance in the communication path request capacity. A communication delay time per unit distance may be calculated by defining a communication path request capacity per unit capacity interval.

The communication delay time largely depends on which channel is usable in the communication terminal. Thus, a capacity before and after the channel available to the communication terminal is not usable due to lacking communication capacities is set as a communication path request capacity, and a communication delay time per unit distance may be calculated each time the channel is unusable. In this case, a communication delay time per unit distance can be efficiently examined.

There will be employed, for the present example, an example in which the processing of randomly defining a communication path request capacity which is equal to or more than the user/application request capacity and is equal to or less than the maximum capacity of the available channel and calculating a communication delay time per unit distance is repeatedly performed five times. The condition of repeatedly calculating a communication delay time per unit distance is exemplary and other conditions may be employed.

When determining a communication path request capacity used for constructing an actual communication path form among the communication path request capacities defined as the capacities equal to or more than the user/application request capacity, the delay calculation unit A133 notifies the communication path request capacity to the communication path construction unit A134 to actually construct a communication path.

The communication path construction unit A134 constructs an actual communication path based on the communication path request capacity received from the delay calculation unit A133. When receiving the communication path request capacity from the delay calculation unit A133, the communication path construction unit A134 first selects a channel to be used for communication by the self terminal by use of the channel select unit A131, and records it as information on the channel used for the communication path in the channel situation management unit A122. Then, a channel select request is transmitted from the information exchange unit A111 to a neighboring communication terminal by use of the selected channel thereby to cause the neighboring communication terminal to select a channel to be used for the communication path, thereby constructing a communication path to the destination.

The following method may be used for the method for selecting a channel in a communication path, for example. For example, a collective management type broadcast tree creation method may be used. Around the self terminal, a channel select request is transmitted to neighboring communication terminals, the self terminal selects the best channel for the communication path from among the selected channels of the neighboring communication terminals, and the above operations are repeatedly performed to gradually extend the communication path (branch), thereby constructing a path to the destination. The method enables a communication path not only for unicast communication path but also for broadcast communication path to be constructed. When a destination is clear, like AODV (Ad hoc On-Demand Distance Vector), the method for flooding communication path construction messages may be used to construct a communication path by distributed operations. The method is exemplary and other methods may be employed.

As described above, the communication path construction unit A134 can construct a communication path with a short communication delay time while meeting the user/application request capacity by use of a communication path request capacity which reduces the communication delay time of the communication path leading to the destination found by the delay calculation unit A133.

The operations will be described below.

Figure 5:
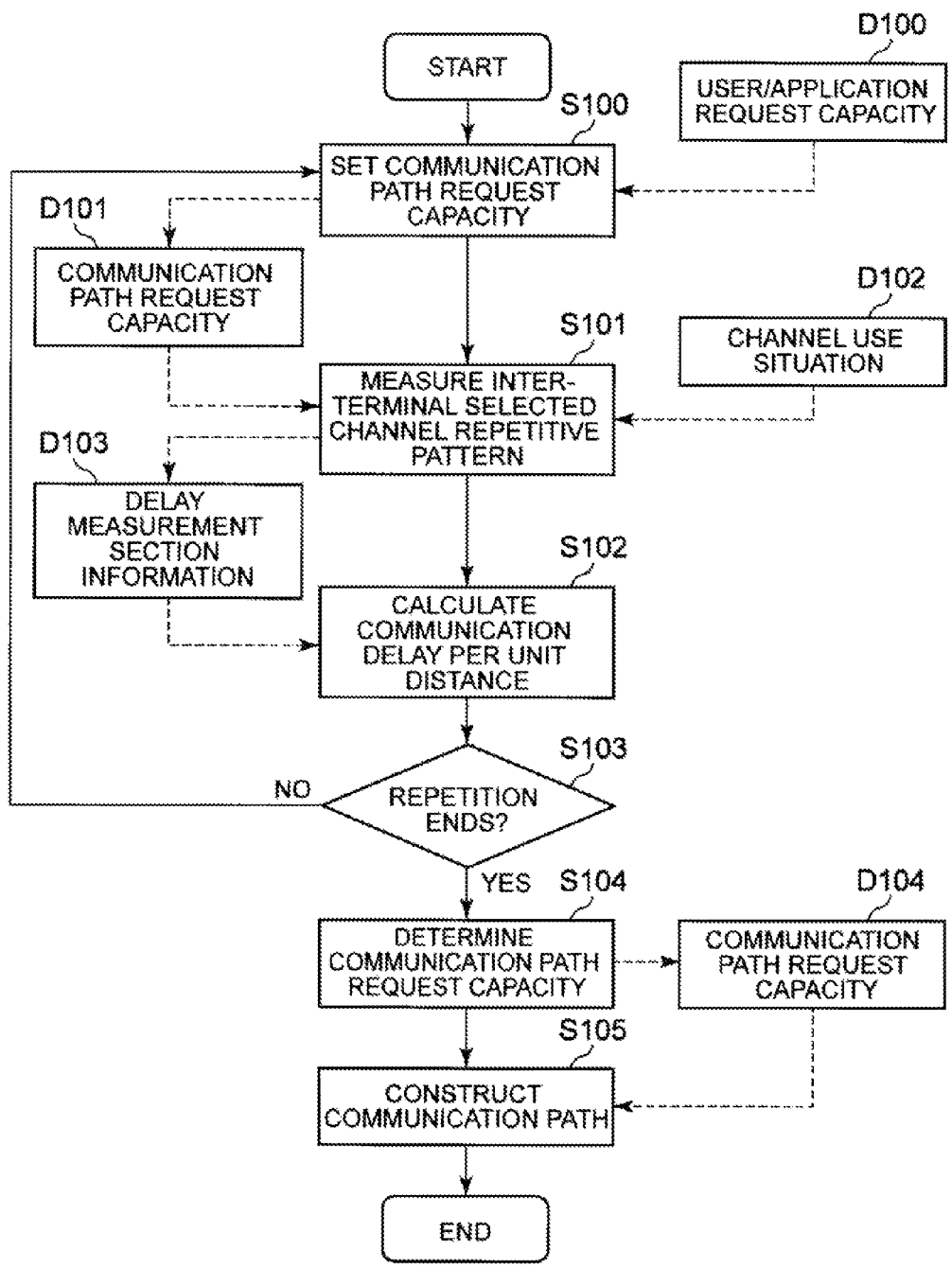
FIG. 5 It depicts a flowchart illustrating the operations of calculating and comparing communication delay times depending on a combination of channels in a different communication path per communication path request capacity.
Figure 6:
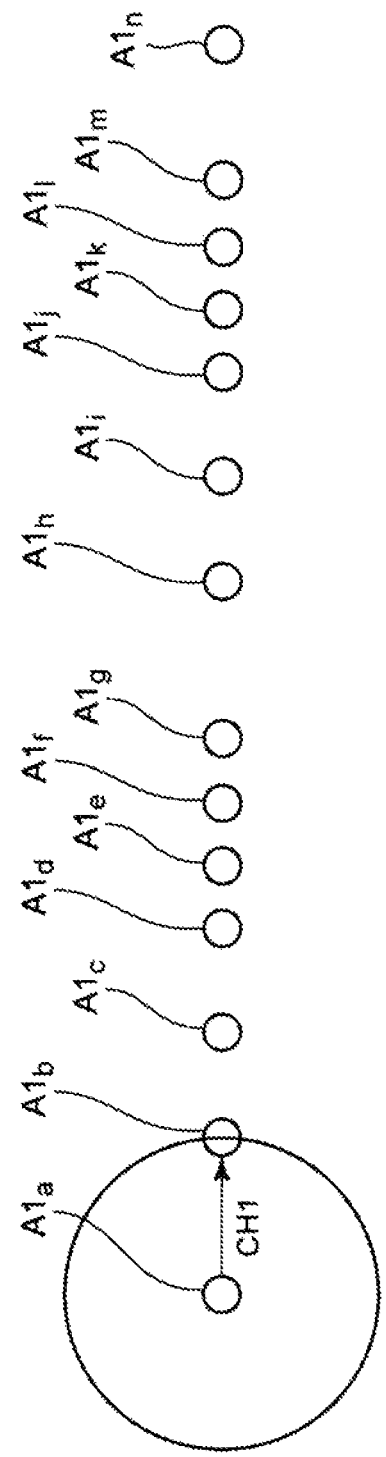
FIG. 6 It depicts an explanatory diagram illustrating a method for calculating a communication delay time depending on a combination of channels used in a communication path.
Figure 7:
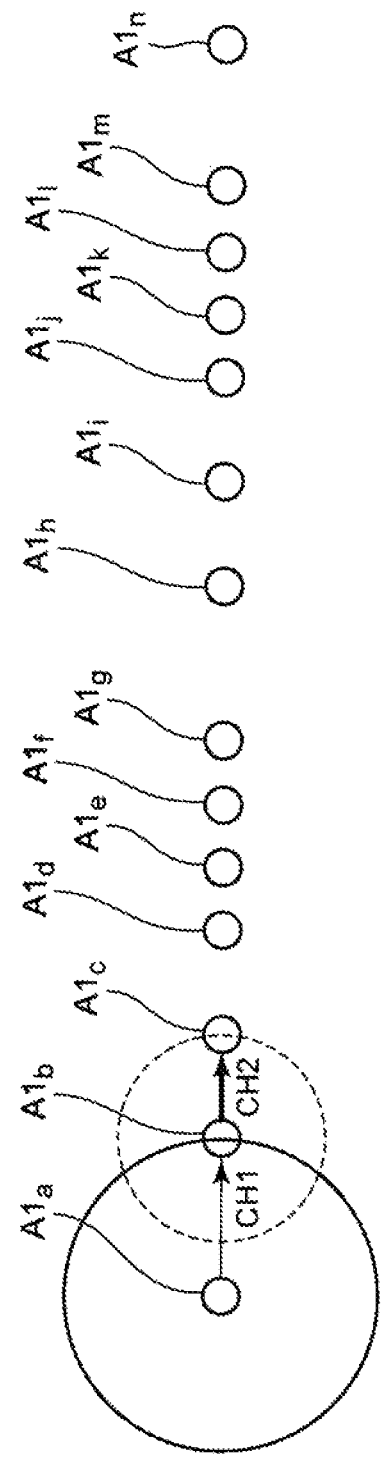
FIG. 7 It depicts an explanatory diagram illustrating a method for calculating a communication delay time depending on a combination of channels used in a communication path.
Figure 8:
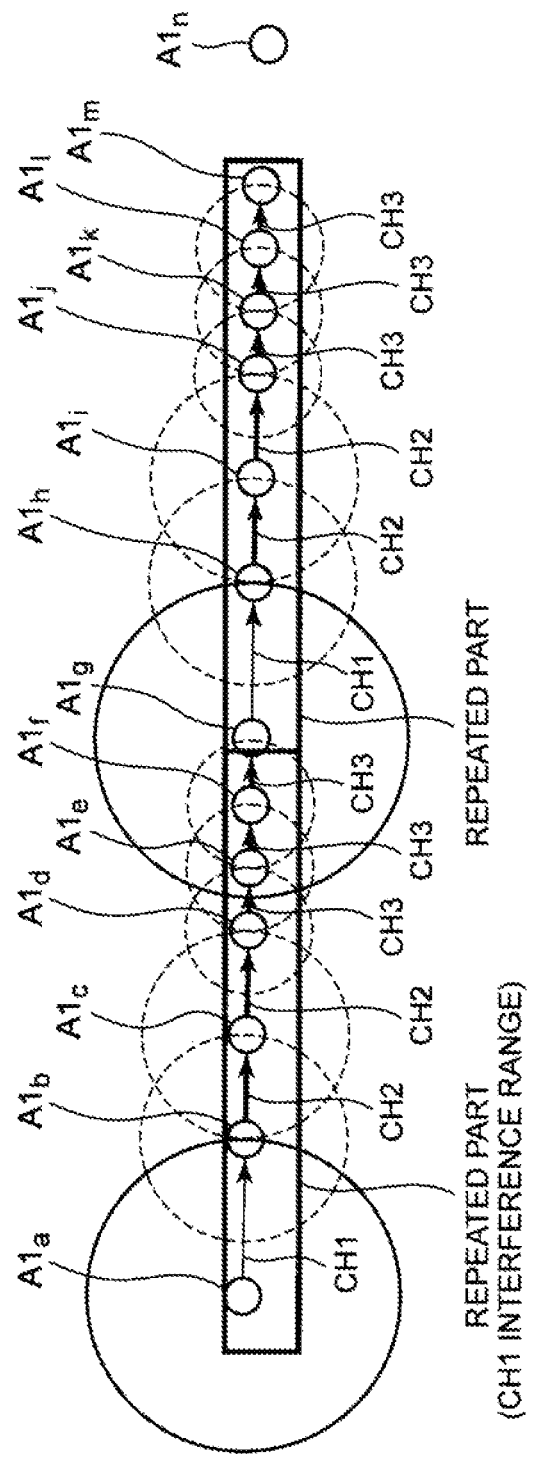
FIG. 8 It depicts an explanatory diagram illustrating a method for calculating a communication delay time depending on a combination of channels used in a communication path.

FIG. 5 is a flowchart illustrating the operations of calculating and comparing communication delay times depending on a combination of channels in a different communication path per communication path request capacity. FIG. 6, FIG. 7 and FIG. 8 are the explanatory diagrams illustrating a method for calculating a communication delay time depending on a combination of channels used in a communication path. The following explanation will be made assuming communication terminals $A1_a$ to $A1_n$ illustrated in FIG. 6 to FIG. 8 by way of example. Herein, the explanation will be made assuming that the communication terminals $A1_a$ to $A1_n$ each have three wireless communication function units A11 (see FIG. 1). In each communication terminal, one of the three wireless communication function units A11 uses a channel CH1, another uses CH2, and the last uses CH3. CH1 to CH3 are assumed to have a relationship of (communication capacity of CH1)< (communication capacity of CH2)<(communication capacity of CH3) and a relationship of (propagation distance of CH1)>(propagation distance of CH2)>(propagation distance of CH3).

For simplified description, FIG. 6 to FIG. 8 illustrate only communication terminals forming a communication path. For example, other communication terminals may be present between the communication terminals $A1_a$ and $A1_b$. Each communication terminal may not be linearly arranged unlike in FIG. 6 to FIG. 8.

In the examples illustrated in FIG. 6 to FIG. 8, the communication terminal $A1_a$ as a transmission source meets the user/application request capacity up to the communication terminal $A1_n$ as a destination, and establishes a communication path with a short communication delay time.

The communication terminal $A1_a$ specifies a communication path request capacity D104 (see FIG. 5) causing a combination of channels on a communication path with the shortest communication delay time from among communication path request capacities D101 (see FIG. 5) equal to or more than the user/application request capacity D100 (see FIG. 5).

In order to perform the processing, the delay calculation unit A133 in the communication terminal $A1_a$ sets the communication path request capacity D101 to be equal to or more than the user/application request capacity D100 (step S100).

Herein, the number of communication terminals capable of using the same channel by the communication path request capacity D101 within an interference range at the same time is determined per channel. It is herein assumed that the number of communication terminals capable of using CH1 at the same time is one, the number of communication terminals capable of using CH2 at the same time is two, and the number of communication terminals capable of using CH3 at the same time is three.

Then, the delay calculation unit A133 notifies the set communication path request capacity D101 to the calculation section measurement unit A132. The calculation section measurement unit A132 starts a processing of measuring an inter-terminal selected channel repetitive pattern in order to determine a communication delay time calculation section (step S101).

In the processing of measuring an inter-terminal selected channel repetitive pattern (step S101), the calculation section measurement unit A132 in the communication terminal $A1_a$ finds an inter-terminal selected channel repetitive pattern appearing on the communication path when the communication path is constructed based on the communication path request capacity D101 given from the delay calculation unit A133.

The calculation section measurement unit A132 first notifies a channel select request, and the communication path request capacity D101 given from the delay calculation unit A133 to the channel select unit A131 in the self terminal, and starts selecting a channel to be used for communication by the self terminal, which meets the communication path request capacity D101.

When receiving the channel select request and the communication path request capacity D101 from the calculation section measurement unit A132, the channel select unit A131 starts selecting a channel to be used for the communication path by the self terminal. The channel select unit A131 first reads the channel use situations D102 of the self terminal and the neighboring terminals from the channel situation management unit A122. The channel select unit A131 selects the channels meeting the notified communication path request capacity D101 from among the channels usable by the self terminal, and selects one channel to be used by the self terminal from among the selected channels according to a predetermined select policy.

At this time, when a channel meeting the communication path request capacity D101 is not present, the channel select unit A131 selects a channel with the largest capacity and absolutely selects at least one channel.

In the present example, the channel select unit A131 in the communication terminal $A1_a$ selects CH1 meeting the communication path request capacity D101 and having the longest propagation distance (see FIG. 6).

When the channel (CH1) to be used by the self terminal is determined, the channel select unit A131 notifies selected channel information indicative of the selected channel CH1 to the calculation section measurement unit A132.

When receiving the selected channel information indicative of the channel CH1 to be used by the self terminal from the channel select unit A131, the calculation section measurement unit A132 causes the information exchange unit A111 to transmit a channel select request containing the information on the communication path request capacity D101 to the neighboring communication terminals communicable on the channel CH1. The inter-terminal selected channel repetitive pattern is examined by the processing.

A neighboring communication terminal receiving the channel select request from the communication terminal $A1_a$ selects a channel in response to the channel select request, but at this time, only returns a channel select result to the communication terminal $A1_a$, not actually using the channel for the communication path.

In the present example, the communication terminal $A1_a$ notifies the channel CH1 and the communication path request capacity D101 in the channel select request to the communication terminal $A1_b$ reachable on the selected channel CH1. The communication terminal $A1_b$ is caused to select a channel used for the communication path.

The channel select unit A131 in the communication terminal $A1_b$ receives the channel select request via the information exchange unit A111. Since CH1 among the channels CH1 to CH3 available to the self terminal $A1_b$ is already used by the communication terminal $A1_a$, the channel select unit A131 determines that the notified communication path request capacity D101 cannot be met. CH2 and CH3 are selected as the channels available to the communication path. The channel select unit A131 selects CH2 with the longest propagation distance out of the channels CH2 and CH3 meeting the communication path request capacity D101 according to a channel select policy. Subsequently, the channel select unit A131 causes the information exchange unit A111 to notify the selected channel CH2 to the communication terminal $A1_a$.

The calculation section measurement unit A132 in the communication terminal $A1_a$ receives the information on the channel (CH2) selected by the communication terminal $A1_b$ via the information exchange unit A111. The calculation section measurement unit A132 stores the use of CH2 in the communication path from the communication terminal $A1_b$ to a next hop (see FIG. 7).

Similarly, the communication terminal $A1_a$ notifies a channel select request containing the previously-selected channels (CH1 and CH2) and the communication path request capacity D101 to the communication terminal $A1_c$ reachable on the channel CH2 selected by the terminal $A1_b$. Specifically, the calculation section measurement unit A132 in the communication terminal $A1_a$ transmits a channel select request containing the previously-selected channels (CH1 and CH2) and the communication path request capacity D101 to the communication terminal $A1_c$ via the information exchange unit A111 in the self terminal.

The communication terminal $A1_c$ receiving the channel select request selects the channels CH2 and notifies the select result to the communication terminal $A1_a$ similarly to the communication terminal $A1_b$. The operations of the communication terminal $A1_c$ are the same as the operations of the communication terminal $A1_b$. Consequently, the calculation section measurement unit A132 in the communication terminal $A1_a$ receives the information on the channel (CH2) selected by the communication terminal $A1_c$ via the information exchange unit A111.

The calculation section measurement unit A132 in the communication terminal $A1_a$ repeats the above operations (that is, the operations of transmitting a channel select request and receiving information on a selected channel) until the communication destination is reached or an inter-terminal selected channel repetitive pattern is detected. At this time, the operations may be repeatedly performed to detect a channel assignment pattern for which a similarity is equal to or more than the threshold as an inter-terminal selected channel repetitive pattern until the assignment pattern for which a similarity of the channel assignment pattern is equal to or more than the threshold is confirmed.

In the example illustrated in FIG. 8, when the communication terminal $A1_a$ transmits a channel select request to the communication terminal $A1_m$ and receives its response, the calculation section measurement unit A132 in the communication terminal $A1_a$ can detect that the channel pattern indicated in a rectangular range in FIG. 8 is repeated twice, and can determine the channel pattern indicated in the rectangular range in FIG. 8 as an inter-terminal selected channel repetitive pattern.

Alternatively, the calculation section measurement unit A132 in the communication terminal $A1_a$ examines an interference range from the self terminal $A1_a$ where an inter-terminal selected channel repetitive pattern occurs, and may restrict the processings required to measure the channel assignment pattern to the minimum. For example, in the example illustrated in FIG. 8, when transmitting a channel select request to the communication terminal $A1_g$ and receiving its response, the calculation section measurement unit A132 in the communication terminal $A1_a$ may determine that the same pattern as the channel pattern starting with the communication terminal $A1_a$ starts also with the communication terminal $A1_g$ based on that the communication terminal $A1_g$ selects the channel CH1, and may determine that the channel pattern from the communication terminal $A1_a$ to the communication terminal $A1_g$ (the pattern indicated in the left rectangular range in FIG. 8) is an inter-terminal selected channel repetitive pattern.

When specifying an inter-terminal selected channel repetitive pattern, the calculation section measurement unit A132 in the communication terminal $A1_a$ notifies, to the delay calculation unit A133, the delay measurement section information D103 containing the information indicative of the communication terminals (the communication terminals $A1_a$ to $A1_g$) in the calculation section and the channel assigned to the communication terminals.

When receiving the delay measurement section information D103 from the calculation section measurement unit A132, the delay calculation unit A133 in the communication terminal $A1_a$ calculates a communication delay time per unit distance in the communication path constructed by use of the communication path request capacity D101 set by the delay calculation unit A133 in step S100 (step S102).

In the present example, it is assumed that the position information on each communication terminal is previously known. Then, it is assumed that the position information is stored in the data storage unit A121. The delay calculation unit A133 reads the position information on the communication terminals $A1_a$ to $A1_g$ from the data storage unit A121 and calculates a distance of the delay measurement section based on the information on the communication terminals contained in the delay measurement section information D103. That is, a distance from the communication terminal $A1_a$ to the communication terminal $A1_g$ is calculated.

The information required for calculating a distance of the delay measurement section may be previously stored in the data storage unit A121, for example. For example, at least a propagation distance per channel may be stored as the information required for calculating a distance of the delay measurement section. If the propagation distance per channel is known, a distance of the delay calculation section in a linear topology model can be found. When the collective management type broadcast tree creation method is used for examining an inter-terminal selected channel repetitive pattern, the position information on each communication terminal may be stored as the information required for calculating a distance of the delay measurement section.

The delay calculation unit A133 designates a channel to be used for the communication path to each communication terminal indicated in the delay measurement section information D103 thereby to measure a communication delay time in the delay measurement section based on the assigned channel information (the information on the inter-terminal selected channel repetitive pattern) contained in the delay measurement section information D103.

The delay calculation unit A133 calculates a communication delay time per unit distance by dividing the measured communication delay time by the distance of the delay measurement section. The delay calculation unit A133 stores the used communication path request capacity D101 and the communication delay time per unit distance in an associated manner.

After step S102 (the processing of calculating a communication delay time per unit distance), the delay calculation unit A133 in the communication terminal $A1_a$ determines whether to finish repeating the processings in steps S100 to S102 (step S103).

In the present example, the delay calculation unit A133 in the communication terminal $A1_a$ randomly sets a communication path request capacity D101 from among the capacities equal to or more than the user/application request capacity D100 and equal to or less than the maximum capacity of the channel available to the communication terminal in step S100. The communication terminal $A1_a$ performs the processings in steps S101 and S102.

If the processings in steps S100 to S102 have been finished five times, the delay calculation unit A133 determines to finish repeating steps S100 to S102 (Yes in step S103).

If the processings in steps S100 to S102 have not been completed five times, the delay calculation unit A133 determines to perform the processings in step S100 to S102 again (No in step S103), and repeats the processings after step S100.

When repeating the processings in step S100 to S102, each time the processing proceeds to step S102, the delay calculation unit A133 stores the communication path request capacity D101 and the communication delay time per unit distance in an associated manner.

In the present example, the repetitive processing end condition is that the processings in steps S100 to S102 are completed five times, but other condition may be employed for the repetitive processing end condition.

When it is determined that the repetitive processings are to end (No in step S103), the delay calculation unit A133 compares the communication delay times per unit distance calculated so far, and selects a communication path request capacity with the shortest communication delay time. The delay calculation unit A133 notifies, to the communication path construction unit A134, the communication path request capacity as a communication path request capacity D104 used for constructing an actual communication path (step S104).

When receiving the communication path request capacity D104 from the delay calculation unit A133, the communication path construction unit A134 uses the channel select unit A131 and the information exchange unit A111 to actually construct a communication path to the destination according to the communication path request capacity D104 (step S105).

With the above operations, the communication terminal $A1_a$ can set a section corresponding to the inter-terminal selected channel repetitive pattern occurring on the communication path as a delay measurement section. Consequently, the delay measurement section can be shortened, thereby to reduce delay measurement overheads. The section corresponding to the inter-terminal selected channel repetitive pattern is set as a communication delay time measurement section so that a communication delay time per unit time can be calculated and compared.

Then, the communication path request capacity D104 capable of shortening the communication delay time in the communication path can be found thereby to construct a communication path.

According to the present exemplary embodiment, the communication channel select unit A13 (specifically, the channel select unit A131, the calculation section measurement unit A132, the delay calculation unit A133 and the communication path construction unit A134) and the information management unit A12 (specifically, the data storage unit A121 and the channel situation management unit A122) include the wireless communication function units A11 and the storage device, and may be realized by a computer operating according to a communication delay time derivation program. For example, the computer may read the communication delay time derivation program and operate as the communication channel select unit A13 and the information management unit A12.

Alternatively, in the communication channel select unit A13, the channel select unit A131, the calculation section measurement unit A132, the delay calculation unit A133 and the communication path construction unit A134 may be realized by separate units, respectively. In the information management unit A12, the data storage unit A121 and the channel situation management unit A122 may be realized by separate units, respectively.

Second Exemplary Embodiment

In the first exemplary embodiment, communication is made with other communication terminals in order to grasp an inter-terminal selected channel repetitive pattern. To the contrary, in the second exemplary embodiment, an inter-terminal selected channel repetitive pattern is estimated by use of a channel use situation of the self terminal, and a channel use situation of other communication terminals previously obtained via exchange with the other communication terminal.

Figure 9:
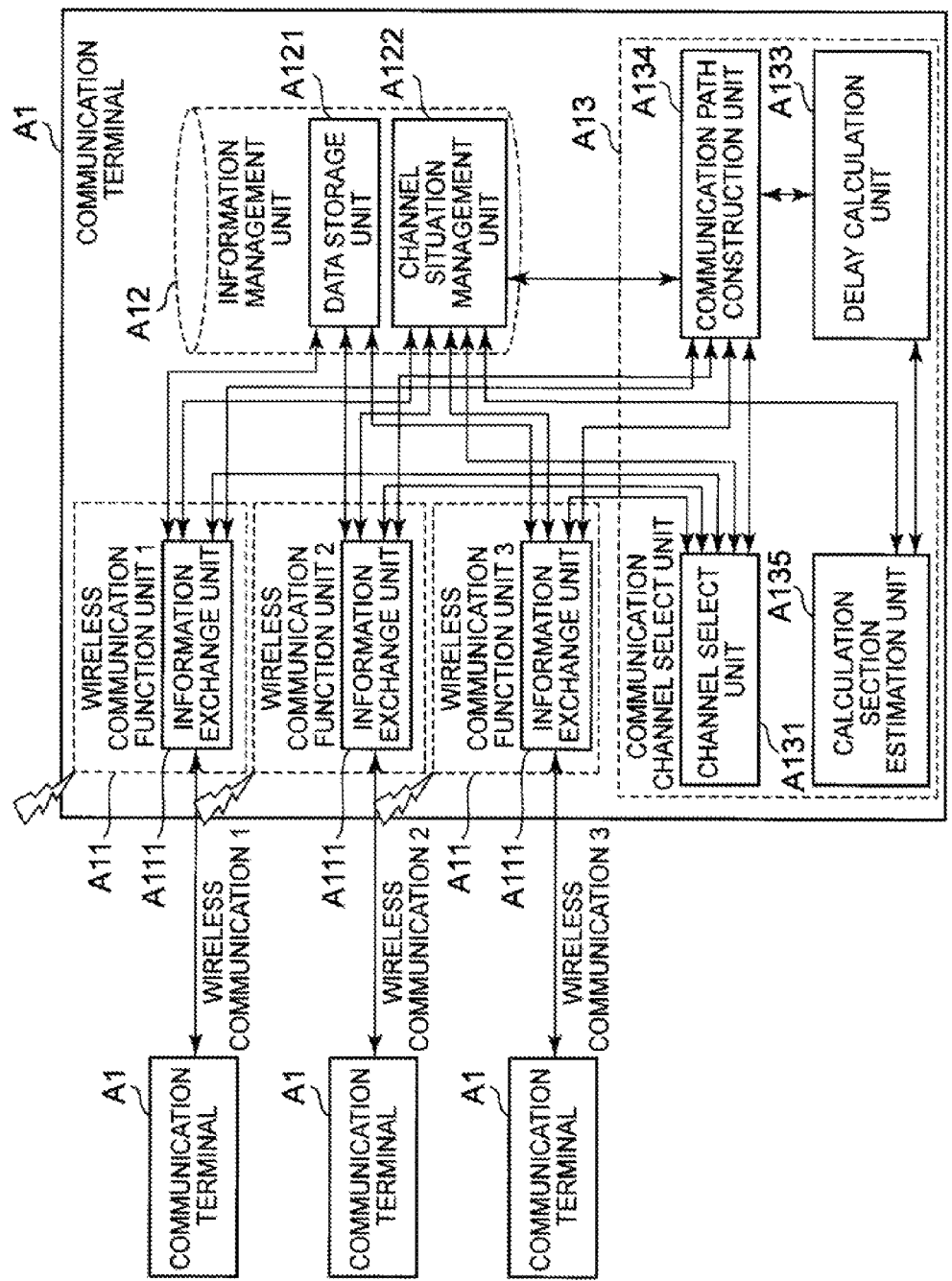
FIG. 9 It depicts a block diagram illustrating an exemplary communication terminal according to a second exemplary embodiment of the present invention.

FIG. 9 is a block diagram illustrating an exemplary communication terminal according to the second exemplary embodiment of the present invention. The same elements as those in the first exemplary embodiment are denoted with the same numerals as those in FIG. 1, and a detailed explanation thereof will be omitted. The communication terminal A1 includes the wireless communication function units A11, the information management unit A12, and the communication channel select unit A13. The second exemplary embodiment is different from the first exemplary embodiment in that the communication channel select unit A13 includes a calculation section estimation unit A135 instead of the calculation section measurement unit A132 in the first exemplary embodiment.

The calculation section estimation unit A135 has a function of estimating a channel to be selected by each neighboring communication terminal by use of a channel use situation of the neighboring communication terminal stored in the channel situation management unit A122, and estimating an inter-terminal selected channel repetitive patter occurring in the communication path.

When receiving a communication path request capacity and a calculation section estimation request from the delay measurement unit A133, the calculation section estimation unit A135 reads a channel use situation of the neighboring communication terminal from the channel situation management unit A122. The calculation section estimation unit A135 estimates which channel the neighboring communication terminal selects based on the read channel use situation information.

The following method may be employed as the method for estimating a channel to be selected by a neighboring communication terminal, for example. For example, a channel to be selected may be simulated by use of the channel use situation of the neighboring communication terminal and the collective management type broadcast tree creation method.

For example, the calculation section estimation unit A135 first grasps a neighboring communication terminal and channels available to the communication terminal based on the channel use situation. A channel to be used by the self terminal is first selected, and an influence when the selected channel is used is reflected on the channel use situation and is recorded.

Then, the calculation section estimation unit A135 grasps the channel use situation of the communication terminal reachable on the channel selected by the self terminal based on the channel use situation on which the influence of the channel selected by the self terminal is reflected. The calculation section estimation unit A135 checks the channel selected by the self terminal when the self terminal is in the same channel use situation as the communication terminal. It is assumed that the same channel as the channel selected by the self terminal is similarly selected by the communication terminal, and a channel to be selected by the communication terminal is estimated. At this time, the calculation section estimation unit A135 selects a channel for a next communication path from among the channels available to the communication terminal according to a channel select policy (such as a select policy for selecting a channel with a long propagation distance).

When a channel for the next communication path is selected, the calculation section estimation unit A135 further reflects the influence when the channel is used on the channel use situation on which the influence of the channel selected by the self terminal is reflected, and records it.

Thereafter, the calculation section estimation unit A135 grasps the channel use situation of the communication terminal reachable on the selected channel from the channel use situation on which the influence when the selected channel is used is reflected, and selects a channel for a next communication path similarly as in the above operations. The calculation section estimation unit A135 can check a communication path channel assignment spread around the self terminal with the repeated operations, and consequently can estimate an inter-terminal selected channel repetitive pattern.

In addition to the above method, a channel may be selected per hop simply by use of a series topology model thereby to find an inter-terminal selected channel repetitive pattern.

In order to reduce the estimation processing loads, an inter-terminal selected channel repetitive pattern is assumed to occur within an interference range of the channels from the self terminal, and a range in which a channel to be selected by other communication terminal is estimated may be limited to the interference range of the channels from the self terminal.

The calculation section estimation unit A135 recognizes the inter-terminal selected channel repetitive pattern estimated in the estimation processing as a channel assignment pattern occurring in an actual network. Then, the calculation section estimation unit A135 stores information indicative of the communication terminals in the section corresponding to the inter-terminal selected channel repetitive pattern and each channel's assignment in the section (that is, the delay measurement section information).

When an inter-terminal selected channel repetitive pattern is estimated, an inter-terminal selected channel repetitive pattern may not occur. In this case, the channels having similar channel properties (bandwidth and propagation distance) are assumed to be the same, and thus an inter-terminal selected channel repetitive pattern may be estimated. When a similarity between the assignment patterns of the estimated channels is calculated and the similarity is equal to or more than the threshold, the two patterns may be assumed as the same pattern and the pattern is determined as an inter-terminal selected channel repetitive pattern.

In order to determine the threshold, for example, a surrounding channel situation is previously scanned and all the channels usable in the network constructed by the communication terminals A1 are grasped so that the threshold of the similarity may be determined based on how much the channels assigned to the wireless communication function units A11 by the communication terminals A1 are overlapped between the communication terminals A1.

It is assumed that a few channels available to the network constructed by the communication terminals A1 is present. In this case, the respective communication terminals A1 are likely to assign the same channel to the wireless communication function units A11. Thus, it is determined that a pattern which can be considered as an inter-terminal selected channel repetitive pattern is likely to occur, and the threshold of the similarity may be set to be as high as 90%, for example. To the contrary, it is assumed that many channels are usable in the network constructed by the communication terminals A1. In this case, the respective communication terminals A1 are less likely to assign the same channel to the wireless communication function units A11. Thus, it is determined that a pattern which can be considered as an inter-terminal selected channel repetitive pattern is less likely to occur, and the threshold of the similarity may be set to be as low as 30%, for example.

With the method, the calculation section estimation unit A135 estimates an inter-terminal selected channel repetitive pattern on the communication path. Then, a range corresponding to the inter-terminal selected channel repetitive pattern is set as a communication delay time measurement section.

The method for estimating an inter-terminal selected channel repetitive pattern is exemplary, and an inter-terminal selected channel repetitive pattern may be estimated by other method.

When completing the estimation of an inter-terminal selected channel repetitive pattern, the calculation section estimation unit A135 transmits, to the delay calculation unit A133, the delay measurement section information indicative of the communication terminals in the section corresponding to the inter-terminal selected channel repetitive pattern and each channel's assignment in the section.

The operations will be described below.

Figure 10:
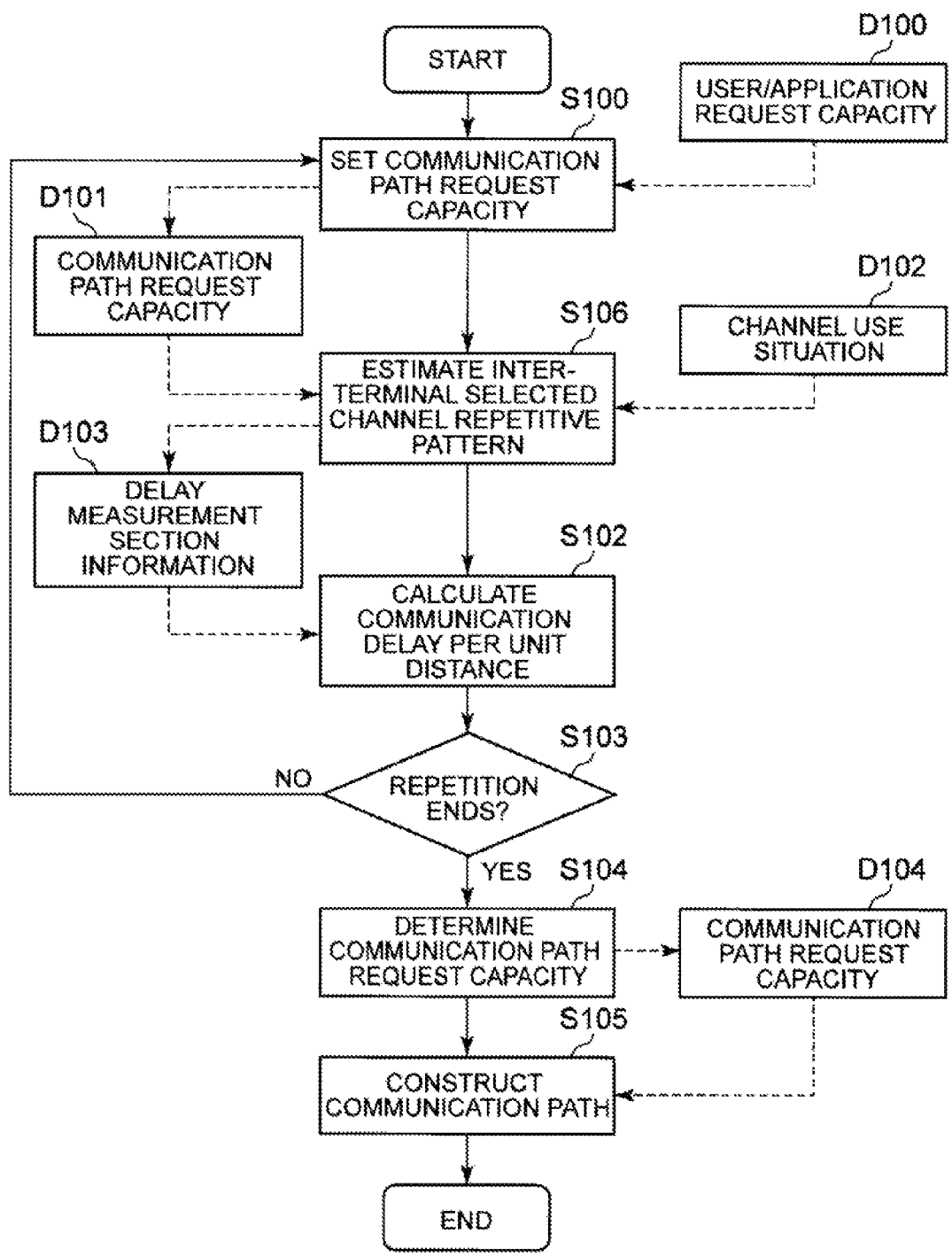
FIG. 10 It depicts a flowchart illustrating an exemplary processing progress according to the second exemplary embodiment of the present invention.

FIG. 10 is a flowchart illustrating an exemplary processing progress according to the second exemplary embodiment of the present invention. The same processings as the processings in the first exemplary embodiment are denoted with the same numerals as in FIG. 5. That is, step S100 and steps S102 to S104 performed by the delay calculation unit A133, and step S105 performed by the communication path construction unit A134 are the same as the processings in the first exemplary embodiment.

An explanation will be made below with reference to FIG. 6 to FIG. 8. As described in the first exemplary embodiment, there will be described a case in which the communication terminals $A1_a$ to $A1_n$ each have three wireless communication function units A11 (see FIG. 9) by way of example. In each communication terminal, one of the three wireless communication function units A11 uses a channel CH1, another uses CH2, and the last uses CH3. CH1 to CH3 are assumed to have a relationship of (communication capacity of CH1)<(communication capacity of CH2)<(communication capacity of CH3) and a relationship of (propagation distance of CH1)>(propagation distance of CH2)>(propagation distance of CH3).

As described above, for simplified description, FIG. 6 to FIG. 8 illustrate only communication terminals forming a communication path. For example, other communication terminals may be present between the communication terminals $A1_a$ and $A1_b$. Each communication terminal may not be linearly arranged unlike in FIG. 6 to FIG. 8.

In the present example, the communication terminal $A1_a$ constructs a broadcast path meeting the user/application request capacity D100 (see FIG. 10) and having a small communication delay from the communication terminal $A1_a$ to the communication terminal $A1_n$.

The communication terminal $A1_a$ specifies a communication path request capacity D104 (see FIG. 10) in which a combination of channels in the communication path with the shortest communication delay time occurs from among the communication path request capacities D101 (see FIG. 10) equal to or more than the user/application request capacity D100 (see FIG. 10).

In order to perform the processing, the delay calculation unit A133 in the communication terminal $A1_a$ first sets the communication path request capacity D101 to be equal to or more than the user/application request capacity D100 (step S100).

Similarly as in the first exemplary embodiment, it is assumed that the number of communication terminals capable of using the same channel at the same time by the communication path request capacity D101 in the interference band is determined per channel. In the present example, it is assumed that the number of communication terminals capable of using CH1 at the same time is one, the number of communication terminals capable of using CH2 at the same time is two, and the number of communication terminals capable of using CH3 at the same time is three.

The delay calculation unit A133 then notifies the set communication path request capacity D101 to the calculation section estimation unit A135. Then, the calculation section estimation unit A135 starts the processing of estimating an inter-terminal selected channel repetitive pattern as a communication delay time calculation section (step S106).

In the inter-terminal selected channel repetitive pattern estimation processing (step S106), the calculation section estimation unit A135 in the communication terminal $A1_a$ estimates an inter-terminal selected channel repetitive pattern when constructing a communication path based on the communication path request capacity D101 given from the delay calculation unit A133.

The calculation section estimation unit A135 first reads the channel use situation D102 (see FIG. 10) of the self terminal and neighboring communication terminals from the channel situation management unit A122. Then, a channel which is used for communication by the self terminal and meets the communication path request capacity D101 starts to be selected based on the communication path request capacity D101 given from the delay calculation unit A133 in step S100 and the channel use situation D102 of the self terminal.

The calculation section estimation unit A135 selects channels meeting the notified communication path request capacity D101 from among the channels (CH1 to CH3) available to the self terminal. Then, the calculation section estimation unit A135 selects a channel to be used by the self terminal from among the selected channels according to a predetermined channel select policy. At this time, when a channel meeting the communication path request capacity D101 is not present, a channel with the largest capacity is selected.

In the present example, the calculation section estimation unit A135 in the communication terminal $A1_a$ selects CH1 meeting the communication path request capacity D101 and having the longest propagation distance (see FIG. 6).

When determining the channel (CH1) to be used by the self terminal, the calculation section estimation unit A135 then starts estimating a channel to be selected by a neighboring communication terminal, and estimates an inter-terminal selected channel repetitive pattern occurring on the communication path.

The calculation section estimation unit A135 starts estimating a channel to be selected for the communication path by the neighboring communication terminal for the neighboring communication terminal capable of communication on the channel (CH1) selected by the self terminal. The channel use situation D102 is used for the estimation. In the present example, the calculation section estimation unit A135 in the communication terminal $A1_a$ starts estimating a channel to be selected by the communication terminal $A1_b$ reachable on CH1.

The calculation section estimation unit A135 uses the channel use situation D102 to grasp the channels (CH1 to CH3) available to the communication terminal $A1_b$. Then, a channel to be selected by the communication terminal $A1_b$ is estimated assuming that a channel to be selected by the self terminal is similarly selected by the communication terminal $A1_b$ when the situation of the communication terminal $A1_b$ (the situation in which the communication terminal $A1_a$ already using CH1 is present in the neighborhood and the communication terminal $A1_b$ can use CH1 to CH3) is applied to the self terminal (the communication terminal $A1_a$).

In the present example, since the communication terminal $A1_a$ already uses CH1 in the situation of the communication terminal $A1_b$, the calculation section estimation unit A135 determines that CH1 cannot meet the communication path request capacity D101. CH2 and CH3 are selected as the channels usable for communication form among the channels available to the communication terminal $A1_b$.

The calculation section estimation unit A135 estimates that a channel to be used for the communication path by the communication terminal $A1_b$ is CH2 with a long propagation distance according to a channel select policy (such as a select policy for selecting a channel with a long propagation distance).

As described above, the calculation section estimation unit A135 estimates a channel (CH2) to be selected for the communication path by the communication terminal $A1_b$, and assumes it as the communication path for a next hop (see FIG. 7).

Similarly, the communication terminal $A1_a$ similarly starts estimating a channel to be used by the communication terminal $A1_c$ for the communication terminal $A1_c$ reachable from the communication terminal $A1_b$ on CH2 estimated as a channel to be used by the communication terminal $A1_b$.

The calculation section estimation unit A135 in the communication terminal $A1_a$ uses the channel use situation D102 to grasp the channels (CH1 to CH3) available to the communication terminal $A1_c$. On the basis of the result of the estimation processing performed so far by the calculation section estimation unit A135, a situation in which the neighboring terminals (the communication terminals $A1_a$ and $A1_b$) of the communication terminal $A1_c$ are using CH1 and CH2 is grasped.

Then, the calculation section estimation unit A135 estimates a channel to be selected by the communication terminal $A1_c$ according to the communication path request capacity D101 and a channel select policy. In the present example, since the communication terminal $A1_a$ uses CH1, it is determined that CH1 cannot meet the communication path request capacity D101. The communication terminal $A1_b$ already uses CH2, but the communication path request capacity D101 can be met even when up to two terminals use CH2 at the same time. Thus, the calculation section estimation unit A135 determines that the communication terminal $A1_c$ can use CH2 for the communication path. The calculation section estimation unit A135 selects CH2 and CH3 as the channels usable for communication from among the channels available to the communication terminal $A1_c$.

The calculation section estimation unit A135 selects CH2 with a long propagation distance as a channel to be used for the communication path according to a channel select policy (such as a select policy for selecting a channel with a long propagation distance). As described above, the calculation section estimation unit A135 estimates a channel (CH2) to be used for the communication path by the communication terminal $A1_c$, and assumes it as the communication path for a next hop.

The calculation section estimation unit A135 performs the operations up to the channel interference range from the self terminal $A1_a$ or until the same channel assignment pattern occurs. The operation of estimating a channel to be used by a communication terminal may be repeated until an assignment pattern for which the similarity of the channel assignment patterns is equal to or more than the threshold is confirmed.

For example, in the example illustrated in FIG. 8, when a channel to be used by the communication terminal $A1_g$ is estimated as CH1, it may be determined that the same pattern as the channel pattern starting with the communication terminal $A1_a$ starts with the communication terminal $A1_g$ and it may be determined that the channel pattern from the communication terminal $A1_a$ to the communication terminal $A1_g$ (the pattern indicated in the left rectangular range in FIG. 8) is an inter-terminal selected channel repetitive pattern. Then, the channels after the communication terminal $A1_h$ may not be estimated.

Alternatively, in the example illustrated in FIG. 8, the channels may be estimated until the channel pattern indicated in the rectangular range in FIG. 8 is detected as being repeated twice. In this case, since if the channels are estimated up to the communication terminal $A1_m$, the inter-terminal selected channel repetitive pattern is detected as appearing twice, a channel for the communication terminal $A1_n$ may not be estimated.

When estimating an inter-terminal selected channel repetitive pattern, the calculation section estimation unit A135 notifies, to the delay calculation unit A133, the delay measurement section information D103 on the inter-terminal selected channel repetitive pattern. That is, the delay measurement section information D103 containing the information on the communication terminals (the communication terminals $A1_a$ to $A1_g$ in the present example) in the calculation section corresponding to the inter-terminal selected channel repetitive pattern and the information on the channels assigned to the communication terminals is notified to the delay calculation unit A133.

When receiving the delay measurement section information D103 from the calculation section estimation unit A135, the delay calculation unit A133 in the communication terminal $A1_a$ calculates a communication delay time per unit distance (step S102) during the construction by use of the communication path request capacity D101 set by the delay calculation unit A133 in step S100. A communication delay time may be actually measured similarly as in the first exemplary embodiment.

Alternatively, a communication delay time may be estimated based on the channel capacities of the channel assignment pattern described in the delay measurement section information D103 and the data size of the data to be transmitted. In this case, as described in the first exemplary embodiment, the delay calculation unit A133 extracts an inter-terminal selected channel repetitive pattern from the delay measurement section information, and divides the data size by the channel capacity per channel forming the inter-terminal selected channel repetitive pattern. A communication delay time may be calculated by the calculated sum. For example, it is assumed that the inter-terminal selected channel repetitive pattern is CH1, CH2, CH2 and CH3 in this order. In this case, the calculation in the Equation (2) may be made to find a communication delay time.

A distance of the delay measurement section may be calculated similarly as in the first exemplary embodiment. For example, a distance of the delay measurement section may be calculated based on the position information on each communication terminal.

Similarly to the first exemplary embodiment, the information required for calculating a distance of the delay measurement section may be previously stored in the data storage unit A121, for example. For example, at least a propagation distance per channel may be stored as the information required for calculating a distance of the delay measurement section. If the propagation distance per channel is known, a distance of the delay calculation section in a linear topology model can be found. If the collective management type broadcast tree creation method is used for simulating channel select by a terminal device, the position information on each communication terminal may be stored as the information required for calculating a distance of the delay measurement section.

The delay calculation unit A133 finds a communication delay time per unit distance by dividing the communication delay time in the section corresponding to the inter-terminal selected channel repetitive pattern by the distance of the section. Then, the delay calculation unit A133 stores the used communication path request capacity D101 and the communication delay time per unit distance in an associated manner.

After step S102 (the processing of calculating a communication delay time per unit distance), the delay calculation unit A133 in the communication terminal $A1_a$ determines whether to finish repeating the processings in steps S100 to S102 (step S103).

In the present example, as in the first exemplary embodiment, the delay calculation unit A133 in the communication terminal $A1_a$ randomly sets a communication path request capacity D101 from among the capacities equal to or more than the user/application request capacity D100 and equal to or less than the maximum capacity of the channel available to the communication terminal in step S100. The communication terminal $A1_a$ then performs the processings in steps S101 and S102.

In step S103, if the processings in steps S100 to S102 have been finished five times, the delay calculation unit A133 determines to finish repeating steps S100 to S102 (Yes in step S103). If the processings in steps S100 to S102 have not been completed five times, the delay calculation unit A133 determines to perform steps S100 to S102 again (No in step S103), and repeats the processings after step S100.

Other condition may be employed for the repetitive processing end condition in step S103.

When it is determined that the repetitive processings are to end (No in step S103), the delay calculation unit A133 compares the communication delay times per unit distance calculated so far, and selects a communication path request capacity with the shortest communication delay time. Then, the delay calculation unit A133 notifies, to the communication path construction unit A134, the communication path request capacity as the communication path request capacity D104 used for constructing an actual communication path (step S104).

When receiving the communication path request capacity D104 from the delay calculation unit A133, the communication path construction unit A134 uses the channel select unit A131 and the information exchange unit A111 to actually construct a communication path up to the destination according to the communication path request capacity D104 (step S105).

With the above operations, even when the communication destination is not unique but unclear and the communication terminals such as transfer terminals or an end terminal on the communication path change depending on a combination of channels on the communication path, the communication terminal $A1_a$ can detect an inter-terminal selected channel repetitive pattern occurring on the communication path. A section corresponding to the inter-terminal selected channel repetitive pattern is set as a communication delay time measurement section so that a communication delay time per unit time can be calculated and compared.

The communication path request capacity D104 capable of shortening the communication delay time can be found thereby to construct the communication path.

According to the present exemplary embodiment, the communication channel select unit A13 (specifically, the channel select unit A131, the calculation section estimation unit A135, the delay calculation unit A133, and the communication path construction unit A134) and the information management unit A12 (specifically, the data storage unit A121 and the channel situation management unit A122) include the wireless communication function units A11 and the storage device, and may be realized by a computer operating according to a communication delay time derivation program. For example, the computer may read the communication delay time derivation program and operate as the communication channel select unit A13 and the information management unit A12.

Alternatively, the channel select unit A131, the calculation section estimation unit A135, the delay calculation unit A133 and the communication path construction unit A134 in the communication channel select unit A13 may be realized by separate units, respectively. The data storage unit A121 and the channel situation management unit A122 in the information management unit A12 may be realized by separate units, respectively.

Figure 11:
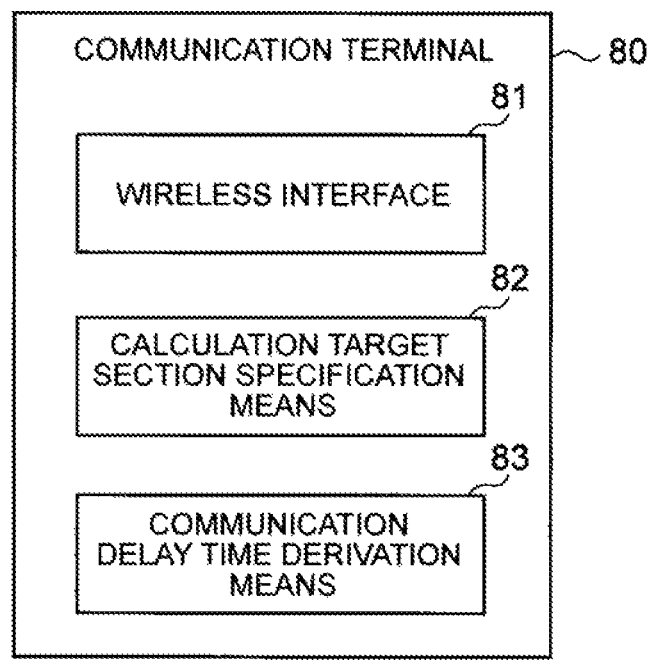
FIG. 11 It depicts a block diagram illustrating an exemplary minimum structure of a communication terminal according to the present invention.
Figure 12:
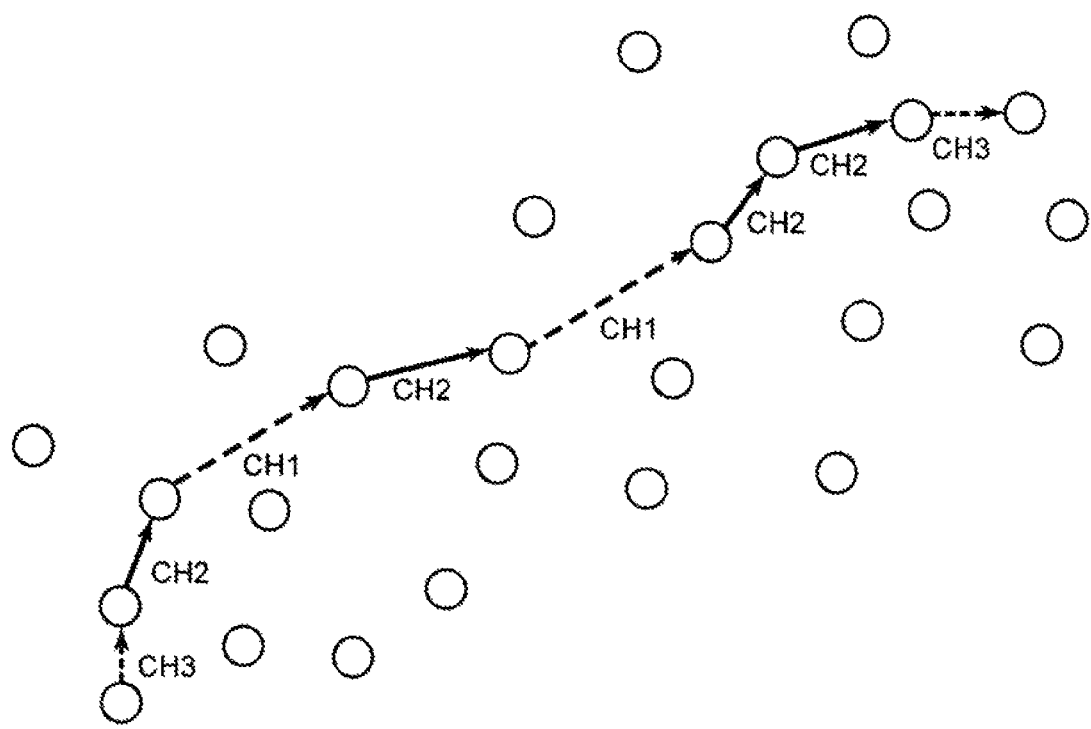
FIG. 12 It depicts an explanatory diagram illustrating exemplary selected channels between communication terminals on a communication path.
Figure 13:
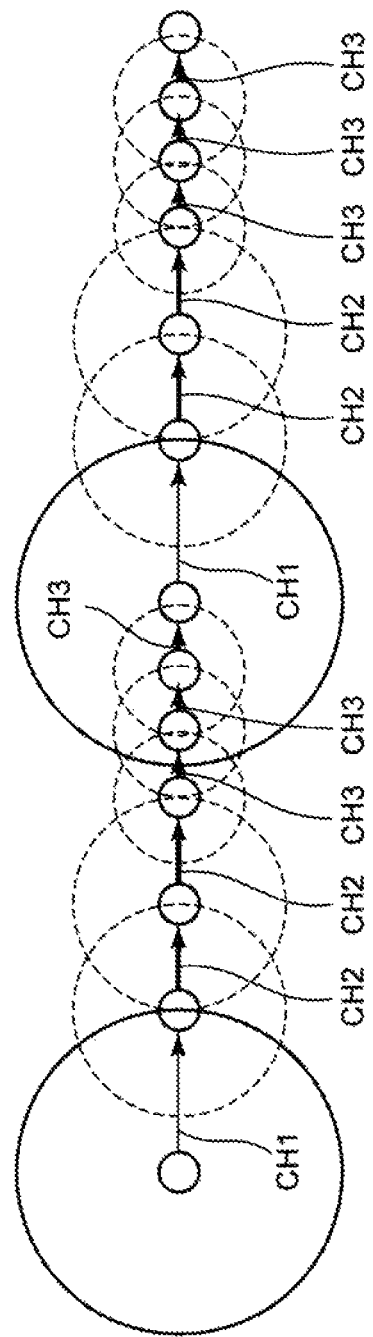
FIG. 13 It depicts an explanatory diagram illustrating exemplary channels selected according to a select policy.
Figure 14:
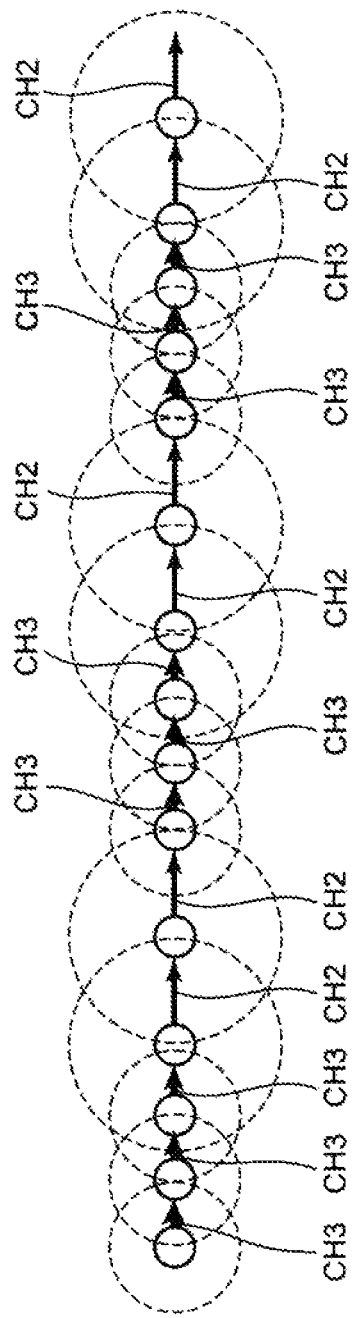
FIG. 14 It depicts an explanatory diagram illustrating exemplary channels selected according to a select policy.

A minimum structure of the present invention will be described below. FIG. 11 is a block diagram illustrating an exemplary minimum structure of a communication terminal according to the present invention. A communication terminal 80 according to the present invention includes at least one wireless interface 81 (such as the wireless communication function unit A11) assigned with a communication channel. The communication terminal 80 includes a calculation target section specification means 82 and a communication delay time derivation means 83.

When selecting a channel to be used for communication in each section on a communication path per section between communication terminals on the communication path, the calculation target section specification means 82 (such as the calculation section measurement unit A132 in the first exemplary embodiment or the calculation section estimation unit A135 in the second exemplary embodiment) detects an inter-terminal selected channel repetitive pattern as a pattern of the selected channels cyclically appearing on the communication path, and defines a section corresponding to the inter-terminal selected channel repetitive pattern as a communication delay time calculation target section.

The communication delay time derivation means 83 (such as the delay calculation unit A133) derives a communication delay time in the calculation target section based on the inter-terminal selected channel repetitive pattern.

With the structure, a communication delay time depending on a combination of channels set between communication terminals on a communication path can be calculated in the MCH/IF environment.

Part of or all the exemplary embodiments can be described as in the following Supplementary notes, but are not limited to the following.

(Supplementary note 1) A communication delay time derivation method, wherein a communication terminal including at least one wireless interface assigned with a communication channel detects an inter-terminal selected channel repetitive pattern as a pattern of selected channels cyclically appearing on a communication path when selecting a channel to be used for communication in each section on the communication path per section between communication terminals on the communication path, and defines a section corresponding to the inter-terminal selected channel repetitive pattern as a communication delay time calculation target section, and derives a communication delay time in the calculation target section based on the inter-terminal selected channel repetitive pattern.

(Supplementary note 2) The communication delay time derivation method according to Supplementary note 1, wherein the communication terminal detects an inter-terminal selected channel repetitive pattern by inquiring a channel to be selected to other communication terminal.

(Supplementary note 3) The communication delay time derivation method according to Supplementary note 1, wherein after selecting a channel in a section from a self communication terminal to other communication terminal, the communication terminal repeatedly estimates a channel to be selected when the self communication terminal is assumed to be in the same channel use situation as other communication terminal as a channel in a section from the other communication terminal to a next communication terminal, thereby detecting an inter-terminal selected channel repetitive pattern.

(Supplementary note 4) The communication delay time derivation method according to any one of Supplementary note 1 to Supplementary note 3, wherein the communication terminal makes communication in a calculation target section according to an inter-terminal selected channel repetitive pattern, and measures a communication delay time in the calculation target section.

(Supplementary note 5) The communication delay time derivation method according to any one of Supplementary note 1 to Supplementary note 3, wherein the communication terminal calculates a communication delay time in a calculation target section based on capacities of individual channels contained in an inter-terminal selected channel repetitive pattern, and a size of data to be transmitted.

(Supplementary note 6) The communication delay time derivation method according to any one of Supplementary note 1 to Supplementary note 5, wherein the communication terminal calculates a communication delay time per unit distance based on a communication delay time in a calculation target section and a distance of the calculation target section.

(Supplementary note 7) A communication terminal including at least one wireless interface assigned with a communication channel, a calculation target section specification means for, when selecting a channel to be used for communication in each section on a communication path per section between communication terminals on the communication path, detecting an inter-terminal selected channel repetitive pattern as a pattern of the selected channels cyclically appearing on the communication path, and defining a section corresponding to the inter-terminal selected channel repetitive pattern as a communication delay time calculation target section, and a communication delay time derivation means for deriving a communication delay time in the calculation target section based on the inter-terminal selected channel repetitive pattern.

(Supplementary note 8) The communication terminal according to Supplementary note 7, wherein the calculation target section specification means detects an inter-terminal selected channel repetitive pattern by inquiring a channel to be selected to other communication terminal.

(Supplementary note 9) The communication terminal according to Supplementary note 7, wherein after selecting a channel in a section from a self communication terminal to other communication terminal, the calculation target section specification means repeatedly estimates a channel to be selected when the self communication terminal is assumed to be in the same channel use situation as the other communication terminal as a channel in a section from the other communication terminal to a next communication terminal, thereby detecting an inter-terminal selected channel repetitive pattern.

(Supplementary note 10) The communication terminal according to any one of Supplementary note 7 to Supplementary note 9, wherein the communication delay time derivation means makes communication within a calculation target section according to an inter-terminal selected channel repetitive pattern thereby to measure a communication delay time in the calculation target section.

(Supplementary note 11) The communication terminal according to any one of Supplementary note 7 to Supplementary note 9, wherein the communication delay time derivation means calculates a communication delay time in a calculation target section based on capacities of individual channels contained in an inter-terminal selected channel repetitive pattern and a size of data to be transmitted.

(Supplementary note 12) The communication terminal according to any one of Supplementary note 7 to Supplementary note 11, wherein the communication delay time derivation means calculates a communication delay time per unit distance based on a communication delay time in a calculation target section and a distance of the calculation target section.

(Supplementary note 13) A communication delay time derivation program mounted on a computer including at least one wireless interface assigned with a communication channel, the program causing the computer to perform a calculation target section specification processing of, when selecting a channel to be used for communication in each section on a communication path per section between communication terminals on the communication path, detecting an inter-terminal selected channel repetitive pattern as a pattern of the selected channels cyclically appearing on the communication path, and defining a section corresponding to the inter-terminal selected channel repetitive pattern as a communication delay time calculation target section, and a communication delay time derivation processing of deriving a communication delay time in the calculation target section based on the inter-terminal selected channel repetitive pattern.

(Supplementary note 14) A communication terminal including at least one wireless interface assigned with a communication channel, a calculation target section specification unit for, when selecting a channel to be used for communication in each section on a communication path per section between communication terminals on the communication path, detecting an inter-terminal selected channel repetitive pattern as a pattern of the selected channels cyclically appearing on the communication path, and defining a section corresponding to the inter-terminal selected channel repetitive pattern as a communication delay time calculation target section, and a communication delay time derivation unit for deriving a communication delay time in the calculation target section based on the inter-terminal selected channel repetitive pattern.

(Supplementary note 15) The communication terminal according to Supplementary note 14, wherein the calculation target section specification unit detects an inter-terminal selected channel repetitive patter by inquiring a channel to be selected to other communication terminal.

(Supplementary note 16) The communication terminal according to Supplementary note 14, wherein after selecting a channel in a section from a self communication terminal to other communication terminal, the calculation target section specification unit repeatedly estimates a channel to be selected when the self communication terminal is assumed to be in the same channel use situation as the other communication terminal as a channel in a section from the other communication terminal to a next communication terminal, thereby detecting an inter-terminal selected channel repetitive pattern.

The present application claims the priority based on Japanese Patent No. 2011-063018 filed on Mar. 22, 2011, the entirety of which disclosure is incorporated by reference.

The present invention has been described above with reference to the exemplary embodiments, but the present invention is not limited to the exemplary embodiments. Those skilled in the art can variously change the structure and details of the present invention within the scope of the present invention.

INDUSTRIAL APPLICABILITY

The present invention is suitably applicable for defining a channel per section between communication terminals and calculating a communication delay time when a plurality of channels is used on a communication path.

REFERENCE SIGNS LIST

A1 Communication terminal
A11 Wireless communication function unit
A12 Information management unit
A13 Communication channel select unit
A111 Information exchange unit A121 Data storage unit
A122 Channel situation management unit
A131 Channel select unit
A132 Calculation section measurement unit
A133 Delay calculation unit
A134 Communication path construction unit
A135 Calculation section estimation unit

What is claimed is:

1. A communication delay time derivation method executed by a communication terminal comprising at least one wireless interface assigned with a communication channel, the communication delay time derivation method comprising:
    detecting an inter-terminal selected channel repetitive pattern as a pattern of selected channels cyclically appearing on a communication path, when selecting a channel to be used for communication in each section on the communication path per section between communication terminals on the communication path;
    defining a section corresponding to the inter-terminal selected channel repetitive pattern as a communication delay time calculation target section; and
    deriving a communication delay time in the calculation target section based on the inter-terminal selected channel repetitive pattern.

2. The communication delay time derivation method according to claim 1, wherein the communication terminal detects the inter-terminal selected channel repetitive pattern by inquiring a channel to be selected to another communication terminal.

3. The communication delay time derivation method according to claim 1, wherein after selecting a channel in a section from the communication terminal to another communication terminal, the communication terminal repeatedly estimates a channel to be selected when the communication terminal is assumed to be in the same channel use situation as the other communication terminal as a channel in a section from the other communication terminal to a next communication terminal, thereby detecting the inter-terminal selected channel repetitive pattern.

4. The communication delay time derivation method according to claim 1, wherein the communication terminal makes communication in the calculation target section according to the inter-terminal selected channel repetitive pattern, and measures the communication delay time in the calculation target section.

5. The communication delay time derivation method according to claim 1, wherein the communication terminal calculates the communication delay time in the calculation target section based on capacities of individual channels contained in the inter-terminal selected channel repetitive pattern, and a size of data to be transmitted.

6. The communication delay time derivation method according to claim 1, wherein the communication terminal calculates the communication delay time per unit distance based on the communication delay time in the calculation target section and a distance of the calculation target section.

7. A communication terminal comprising:
    at least one wireless interface assigned with a communication channel;
    a calculation target section specification unit for, when selecting a channel to be used for communication in each section on a communication path per section between communication terminals on the communication path, detecting an inter-terminal selected channel repetitive pattern as a pattern of the selected channels cyclically appearing on the communication path, and defining a section corresponding to the inter-terminal selected channel repetitive pattern as a communication delay time calculation target section; and
    a communication delay time derivation unit for deriving a communication delay time in the calculation target section based on the inter-terminal selected channel repetitive pattern.

8. The communication terminal according to claim 7, wherein the calculation target section specification unit detects the inter-terminal selected channel repetitive pattern by inquiring a channel to be selected to another communication terminal.

9. The communication terminal according to claim 7, wherein after selecting a channel in a section from the communication terminal to another communication terminal, the calculation target section specification unit repeatedly estimates a channel to be selected when the communication terminal is assumed to be in the same channel use situation as the other communication terminal as a channel in a section from the other communication terminal to a next communication terminal, thereby detecting the inter-terminal selected channel repetitive pattern.

10. A non-transitory computer-readable recording medium in which a communication delay time derivation program is recorded, the communication delay time derivation program causing a computer comprising at least one wireless interface assigned with a communication channel to perform:
    a calculation target section specification processing of, when selecting a channel to be used for communication in each section on a communication path per section between communication terminals on the communication path, detecting an inter-terminal selected channel repetitive pattern as a pattern of the selected channels cyclically appearing on the communication path, and defining a section corresponding to the inter-terminal selected channel repetitive pattern as a communication delay time calculation target section; and
    a communication delay time derivation processing of deriving a communication delay time in the calculation target section based on the inter-terminal selected channel repetitive pattern.

* * * * *